United States Patent [19]

Nakagomi et al.

[11] Patent Number: 4,588,518

[45] Date of Patent: May 13, 1986

[54] NEMATIC LIQUID CRYSTAL COMPOSITION FOR DISPLAY DEVICES

[75] Inventors: Tamihito Nakagomi; Kazuhisa Toriyama, both of Mobara; Masatoshi Ito, Tokyo, all of Japan

[73] Assignee: Hitachi, Ltd., Tokyo, Japan

[21] Appl. No.: 70,724

[22] Filed: Aug. 29, 1979

[30] Foreign Application Priority Data

Aug. 30, 1978 [JP] Japan ................................. 53-104938

[51] Int. Cl.$^4$ .......................... G02F 1/13; C09K 3/34
[52] U.S. Cl. ............................ 252/299.61; 252/299.5; 252/299.63; 252/299.64; 252/299.65; 252/299.66; 252/299.67; 252/299.68; 350/350 R
[58] Field of Search ................ 252/299, 299.5, 299.63, 252/299.64, 299.62, 299.65, 299.61, 299.66, 299.68; 350/350 R

[56] References Cited

U.S. PATENT DOCUMENTS

| | | | |
|---|---|---|---|
| 3,947,375 | 3/1976 | Gray et al. | 252/299 |
| 3,983,049 | 9/1976 | Aftergut et al. | 252/299 |
| 3,997,536 | 12/1976 | Boller et al. | 252/299 |
| 4,002,670 | 1/1977 | Steinstrasser | 252/299 |
| 4,011,173 | 3/1977 | Steinstrasser | 252/299 |
| 4,020,002 | 4/1977 | Oh | 252/299 |

(List continued on next page.)

FOREIGN PATENT DOCUMENTS

| | | | |
|---|---|---|---|
| 2257588 | 6/1973 | Fed. Rep. of Germany | 252/299 |
| 2837218 | 3/1979 | Fed. Rep. of Germany | 252/299 |
| 2854310 | 6/1979 | Fed. Rep. of Germany | 252/299 |
| 2846409 | 6/1979 | Fed. Rep. of Germany | 252/299 |
| 105701 | 5/1974 | German Democratic Rep. | 252/299 |
| 132591 | 10/1978 | German Democratic Rep. | 252/299 |
| 2017742A | 10/1979 | United Kingdom | 252/299 |

OTHER PUBLICATIONS

Krause, J., et al., Abst. of 6th Int. Liq. Cryst. Conf., I-3, Kent, Ohio, (Aug. 23-27, 1976).
Demus, D., "Nonemissive Electrooptic Displays", pp. 83-119, (1975).

Primary Examiner—Teddy S. Gron
Attorney, Agent, or Firm—Antonelli, Terry & Wands

[57] ABSTRACT

A nematic liquid crystal composition comprising (a) at least one compound of the formula:

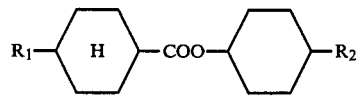

wherein $R_1$ is $n\text{—}C_mH_{2m+1}$, $n\text{—}C_mH_{2m+1}\text{—}O$ or $n\text{—}C_mH_{2m+1}\text{—}CO$; $R_2$ is $n\text{—}C_qH_{2q+1}$, $n\text{—}C_qH_{2q+1}\text{—}O$ or $n\text{—}C_qH_{2q+1}\text{—}CO$; m and q are each an integer of 1 to 10 and n is a symbol indicating that carbons are linked linearly, and (b) at least one compound of the formula:

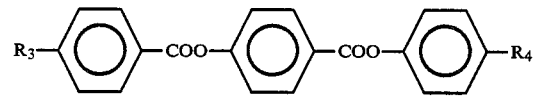

wherein $R_3$ is $n\text{—}C_rH_{2r+1}$ or $n\text{—}C_rH_{2r+1}\text{—}O$; $R_4$ is $n\text{—}C_sH_{2s+1}$ or $n\text{—}C_sH_{2s+1}\text{—}O$; r and s are each an integer of 1 to 10 and n is as defined above, and where necessary (c) at least one nematic liquid crystal compound having positive dielectric anisotropy and/or its homologous compound, and if necessary (d) at least one nematic liquid crystal compound having negative dielectric anisotropy and/or its homologous compound. This liquid crystal composition, when used for a display device, shows excellent properties in that it is oriented with high stability over a wide temperature range, allows wide-range setting of threshold voltage and is small in temperature dependency and quick to respond to the applied voltage.

36 Claims, 12 Drawing Figures

U.S. PATENT DOCUMENTS

| | | | |
|---|---|---|---|
| 4,027,950 | 6/1977 | Moriyama et al. | 252/299 |
| 4,031,028 | 6/1977 | Maze | 252/299 |
| 4,053,431 | 10/1977 | Scherrer et al. | 252/299 |
| 4,058,477 | 11/1977 | Boller et al. | 252/299 |
| 4,058,478 | 11/1977 | Boller et al. | 252/299 |
| 4,113,647 | 9/1978 | Coates et al. | 252/299 |
| 4,118,335 | 10/1978 | Krause et al. | 252/299 |
| 4,130,502 | 12/1978 | Eidenschink et al. | 252/299 |
| 4,136,053 | 1/1979 | Steinstrasser et al. | 252/299 |
| 4,137,192 | 1/1979 | Matsufuji | 252/299 |
| 4,137,250 | 1/1979 | Reynolds | 252/299 |
| 4,147,651 | 4/1979 | Oh | 252/299 |
| 4,149,413 | 4/1979 | Gray et al. | 252/299 |
| 4,154,697 | 5/1979 | Eidenschink et al. | 252/299 |
| 4,173,544 | 11/1979 | Osman | 252/299 |
| 4,180,475 | 12/1979 | Schadt et al. | 252/299 |

NEMATIC LIQUID CRYSTAL COMPOSITION FOR DISPLAY DEVICES

BACKGROUND OF THE INVENTION

This invention relates to a nematic liquid crystal composition used for display devices, particularly those of a time-division (or time sharing) driving system.

It is said that the most desirable liquid crystal materials (including compounds and compositions) used for field-effect type liquid crystal display elements, such as for example twisted nematic type (TN type) liquid crystal display elements, are those which meet the following three requirements:

First requirement: good adaptability to the orientation controlling section.

Second requirement: operability over a wide temperature range.

Third requirement: good responsiveness over a wide temperature range, particularly at low temperatures.

Various types of liquid crystal materials for display elements, particularly those of a time-division driving system, such as Schiff base type, ester type, biphenyl type, azoxy type, etc., have been proposed to date. The azoxy type liquid crystal materials have excellent temperature characteristic (small in $\Delta T$), that is, they are very limited in variation of threshold voltage with change of temperature and, as explained later, they provide an operational margin M of greater than 10% under the ⅓ bias and ⅓ duty time-division driving conditions. The azoxy liquid crystal materials are represented by the following general formula:

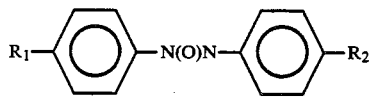

These materials possess per se weakly negative dielectric anisotropy and are usually used as a mixed system with a nematic liquid crystal compound having positive dielectric anisotropy ($N_p$). But these axoxy type liquid crystal materials are colored (in yellow) when they absorb a part of visible light. Also, they show the maximum light absorption at 350 nm and undergo the following photochemical reaction owing to the wavelength around such level:

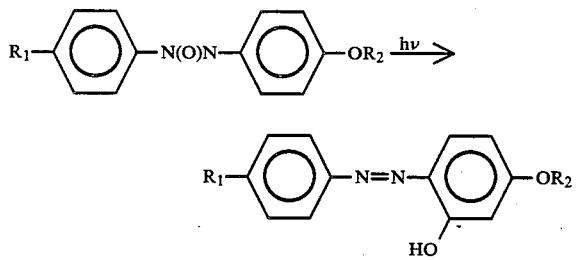

A non-liquid crystal compound is produced by such photochemical reaction and this new product changes the color of the liquid crystal from yellow into red. Usually, electric resistance of the liquid crystal is also sharply lowered. Therefore, in actual use of such azoxy type nematic liquid crystals, these is a need to adapt a 500 nm cut filter in the device (element) so as to avoid photo-deterioration that might be caused by the sunlight or fluorescent light. This use of a filter naturally complicates the mechanism of the device (element).

Other types of liquid crystals which are resistant to such photo-deterioration, such as Schiff base type, biphenyl type, ester type, etc., have been noticed for their availability as white display material and their adaptation to such display devices has been debated.

The biphenyl type liquid crystals are credited with high chemical stability as they are highly resistant to light, water and oxygen. However, most of the known biphenyl type materials which form liquid crystal at room temperature are the ones having positive dielectric anisotropy, and few are known of the negative equivalents which are liquid crystal at room temperature and practically useful. Therefore, there are only a few kinds of liquid crystal compounds which can form a mixed system with biphenyl type alone. Also, because of a not so high value of positive dielectric anisotropy, a wide range adjustment of the threshold value is hardly possible with these materials, and further, such threshold voltage has high temperature dependency, so that these materials are generally considered unsuited for time-division driving.

The ester type liquid crystal compounds have relatively good chemical stability and there are known many kinds of single liquid crystal compounds of positive or negative dielectric anisotropy. However, threshold voltage of these compounds has relatively high temperature dependancy and their viscosity is also considerably high, so that generally these compounds can hardly meet the afore-said second and third requirements.

The Schiff base type liquid crystal compounds have better properties than the ester type, but because of strong hydrolytic disposition, matching with the packing portion of the display element is often required for their use.

Individual liquid crystal materials are disclosed in, for example, U.S. Pat. Nos. 4,137,192 and 4,147,651, Molecular Crystals and Liquid Crystals 22, 285–299 (1973), J. Org. Chem. 38, 3160–3164 (1973), East German Pat. No. 105,701, etc., but their special combinations are not known yet.

The present inventors have already found that a liquid crystal system which meets the afore-said second and their requirements can be obtained by using a nematic liquid crystal compound with negative dielectric anisotropy ($N_n$ type liquid crystal compound) as matrix and adding a suitable amount of a nematic liquid crystal compound with positive dielectric anisotropy ($N_p$ type liquid crystal compound) and/or its homologue (the term "homologue" is used to refer to the materials which are analogous in molecular structure to the positive nematic liquid crystal compounds, and such materials are hereinafter referred to as $N_p$ type liquid crystal homologue), and that such liquid crystal system can be obtained from Schiff base type liquid crystal compounds or cyclohexanecarboxylic acid-trans-4'-alkoxyphenyl esters, but such system is still unsatisfactory.

SUMMARY OF THE INVENTION

Objects of this invention are to eliminate such disadvantages of the conventional liquid crystal compounds such as above-mentioned and to provide an improved liquid crystal composition which is oriented with high stability over a wide temperature range, allows wide-range setting of threshold voltage and is small in temperature dependency of such threshold voltage and also quick to respond to the applied voltage.

More specifically, this invention provides a nematic liquid crystal composition for use in display devices comprising (a) at least one compound of the formula:

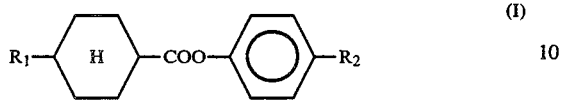

(I)

wherein $R_1$ is n—$C_mH_{2m+1}$, n—$C_mH_{2m+1}$—O or n—$C_mH_{2m+1}$—CO; $R_2$ is n—$C_qH_{2q+1}$, n—$C_qH_{2q+1}$—O or n—$C_qH_{2q+1}$—CO; and m and q are each an integer of 1 to 10 and n is a symbol indicating that carbons are linked linearly, and (b) at least one compound of the formula:

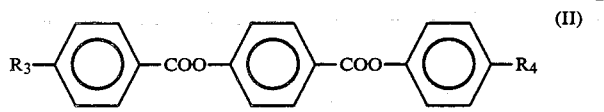

(II)

wherein $R_3$ is n—$C_rH_{2r+1}$ or n—$C_rH_{2r+1}$—O; $R_4$ is n—$C_sH_{2s+1}$ or n—$C_sH_{2s+1}$—O; r and s are each an integer of 1 to 10 and n is as defined above.

The nematic liquid crystal composition provided according to this invention may comprise, in addition to the above essential components (a) and (b) (hereinafter referred to as mixed system), (c) at least one nematic liquid crystal compound with positive dielectric anisotropy and/or its homologous compound, and if necessary, (d) at least one nematic liquid crystal compound with negative dielectric anisotropy and/or its homologous compound.

BRIEF DESCRIPTION OF THE DRAWINGS

In the accompanying drawings:

FIG. 10 is a diagram showing the electro-optical characteristics in relation to the loading of

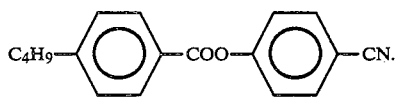

Figure 11:
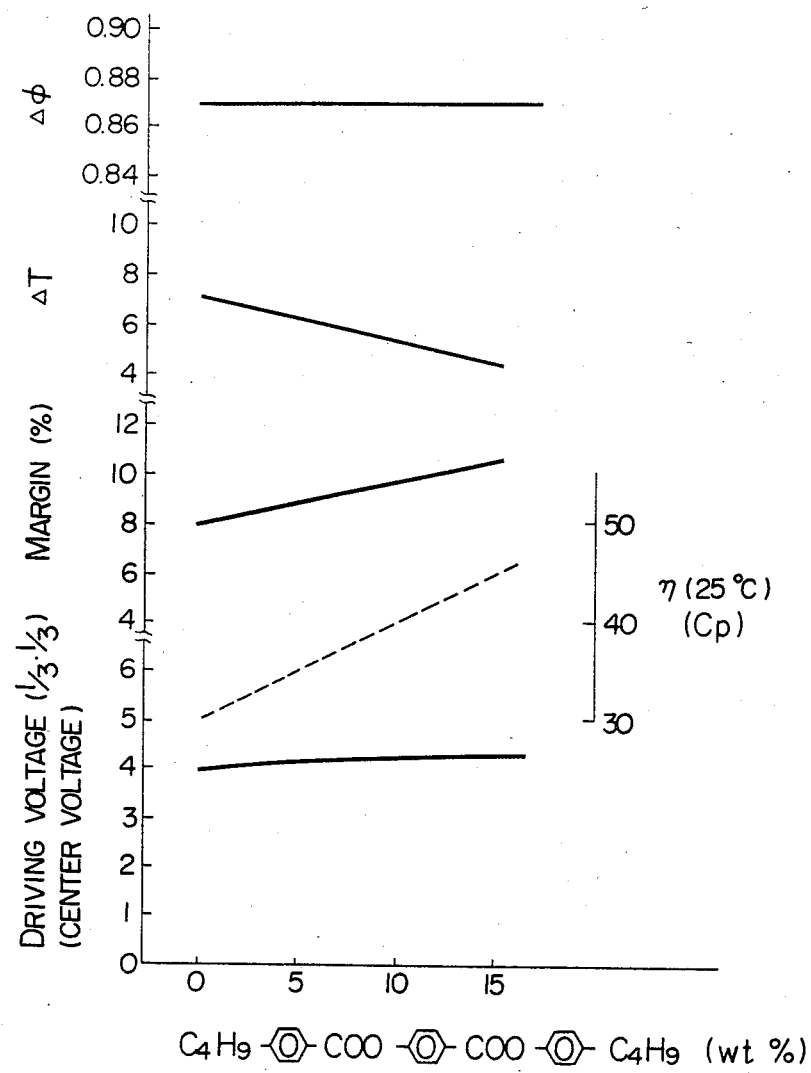

FIG. 11 is a diagram showing the electro-optical characteristics in relation to the loading of

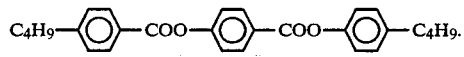

Figure 12:
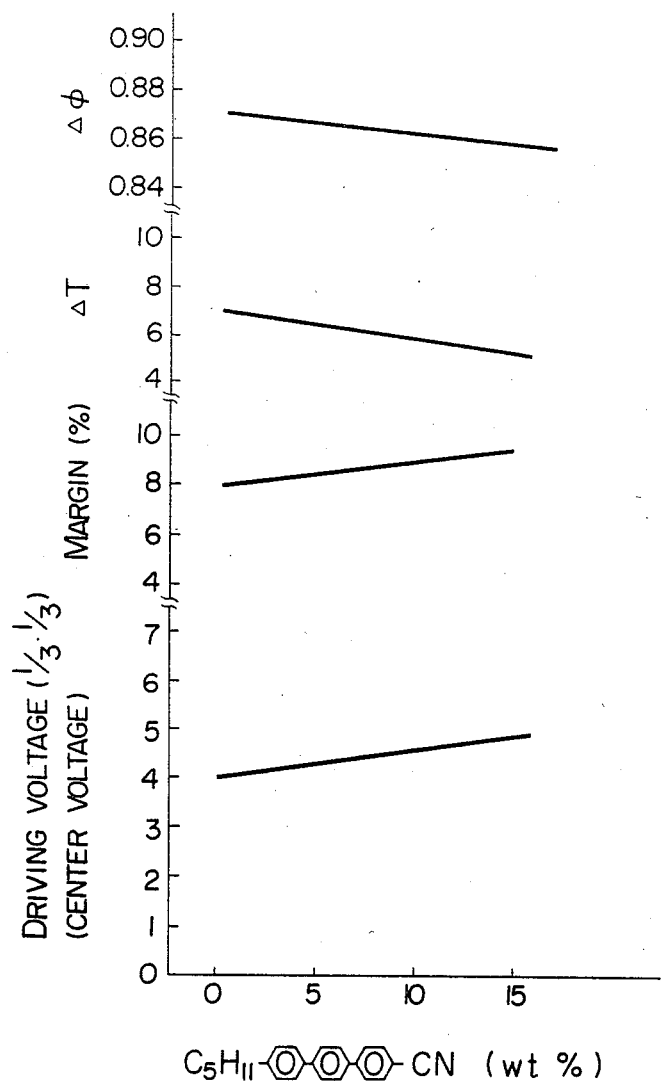

FIG. 12 is a diagram showing the electro-optical characteristics in relation to the loading of

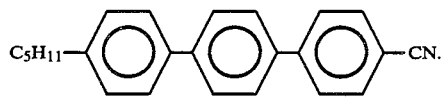

DESCRIPTION OF THE INVENTION

Before describing the respective components of the composition of this invention, a closer review is here given of the afore-said three requirements for a practical liquid crystal material.

Regarding the first requirement, it is of paramount importance for the structure of the display element to control the molecular arrangement such that the molecules of the liquid crystal compound will be oriented parallel to each other and in one direction at the interface of the upper and lower plates which hold the molecules. Such control has been accomplished heretofore by forming a SiO film at the interface by oblique vacuum vaporization, or by rubbing techniques.

As for the second requirement, it is the minimum requirement that the material is liquid crystal at around normal temperature (25° C.), but practically, it is required that the material presents a liquid crystal condition in the temperature range of −10° C. to about +60° C. or higher.

The transition temperature of the solid and liquid crystal compounds referred to in this invention is decided and defined according to the results of the following measurements. There are many occasions where the individual single liquid crystal compounds or mixed compositions thereof undergo over-cooling. In such a case, the compound (or composition) is cooled to a sufficiently low temperature (for example −40° C.) and then the transition temperature in the rising trend of temperature is measured by a micro melting-point measuring apparatus, and the thus measured temperature is given as transition temperature of the solid or liquid crystal compounds. This second requirement is of great significance not only for ordinary static driving but also for driving by a so-called time-division driving system. The time-division driving system according to, for example, the voltage-averaging method is now predominantly employed in the liquid crystal display devices, particularly those requiring voluminous informations, such as for example table-type electronic computers or matrix displays. Low voltage driving is desirable for the table-type electronic computers or the like, and usually there is employed a 4.5 V driving system (using three 1.5 V cells) or 3 V driving system (using two 1.5 V cells) where the cells are connected in series to effect direct driving. This low voltage driving requires no boosting circuit since the cells are connected in series, and also the cell life can be prolonged to 500 to 2,000 hours by combination with C-MOS.

However, such time-division driving system is subject, in principle, to certain operational restrictions which are not seen in the static driving system. In the time-division display devices, it is required to prevent cross-talks in the picture element at each half-selection or non-selection point, and the voltage-averaging method is most popularly used for prevention of such cross-talks. This method was devised for expanding the operational margin by averaging the cross-talk voltages to enlarge the difference from the selection voltage. This method is explained below by citing a typical case of application.

Figure 3:
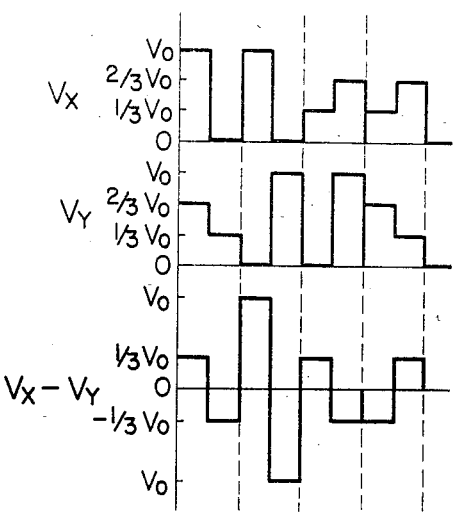
FIG. 3 shows an example of time-division driving waveforms according to the voltage-averaging method (⅓ bias).

Described here is a case of application of the voltage-averaging method where the cross-talk voltages are averaged down to ⅓ of the selection voltage and the driving wave form is made alternating. The driving wave form of this system is shown in FIG. 3 in which Vx is selection voltage, Vy is signal voltage, and Vx-Vy is applied voltage. In FIG. 3, a voltage of $\pm V_o$ is applied to the liquid crystal in the selected condition while a voltage of $\pm(\frac{1}{3})Vo$ is applied to the liquid crystal in the half-selected or non-selected condition. In this case, the effective voltage $v_{s1}$ applied to the display point (the point at which the liquid crystal is brought into a displaying condition) is given by the following formula:

$$v_{s1} = \sqrt{\frac{1}{N}\left(Vo^2 + (N-1)\frac{1}{9}Vo^2\right)} \quad (1)$$

$$= \frac{1}{3} Vo \sqrt{1 + \frac{8}{N}}$$

wherein N: duty number

On the other hand, effective voltage $v_{s2}$ applied to the non-display point is given by:

$$v_{s2} = \tfrac{1}{3} Vo \quad (2)$$

Here, in order to evolve a displaying mode at the display point, effective voltage $v_{s1}$ must be greater than or equal to threshold voltage $V_{th}$ of the liquid crystal ($v_{s1} \geq V_{th}$), and in order to prevent cross-talks from being produced at the non-display point, effective voltage $v_{s2}$ must be smaller than or equal to $V_{th}$ ($v_{s2} \geq V_{th}$). In other words, the following condition must be met for providing a cross-talk-free display according to this driving system:

$$v_{s2} \geq V_{th} \geq v_{s1} \quad (3)$$

Introducing the formulae (1) and (2) into the formula (3), $V_o$ is defined as follows:

$$3 V_{th} \sqrt{\frac{N}{N+8}} \leq V_o \leq 3 V_{th} \quad (4)$$

Figure 8:
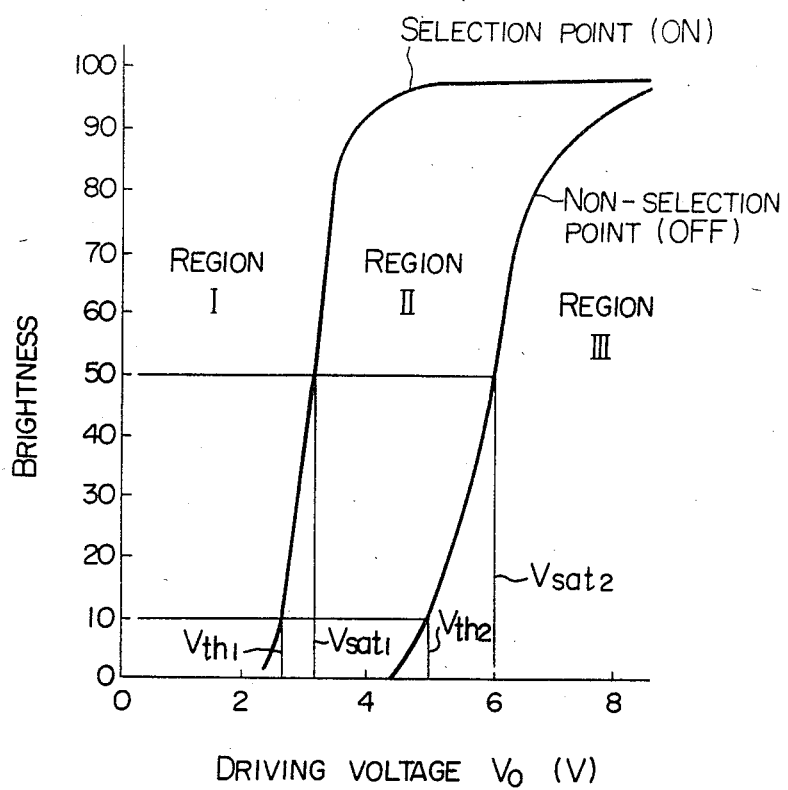
FIG. 8 is a diagram showing the brightness-voltage characteristics at time-division driving.

Measuring brightness at the display and non-display points by varying $V_o$, there are obtained the results such as shown in FIG. 8. At the display and non-display points exist the liquid crystal threshold voltages $V_{th1}$ and $V_{th2}$ as converted to the $V_o$ basis, and when the following condition is met:

$$V_{th1} \geq V_o \geq V_{th2} \quad (5)$$

cross-talk-free display is made possible. From the formula (4), $V_{th1}$ and $V_{th2}$ can be given as follows:

$$V_{th1} = 3 V_{th} \sqrt{\frac{N}{N+8}} \quad (6)$$

$$V_{th2} = 3 V_{th} \quad (7)$$

To be more exact concerning the formula (5), the lower threshold value of voltage that allows display is not $V_{th1}$ but should rather be the saturation voltage $V_{sat1}$ shown in FIG. 8. In other words, the voltage range that allows cross-talk-free display is given by the following formula:

$$V_{sat1} \geq V_o \geq V_{th2} \quad (8)$$

Figure 4:
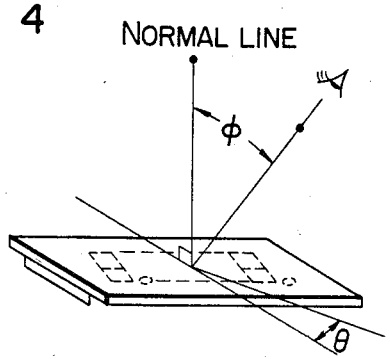
FIG. 4 is a drawing showing the definition of viewing angle.

It may be said that the greater the range of fluctuation of $V_o$ in the above-formula (8), the broader is the operational margin (M) of the display device. In the above-described derivation of formulae, $v_{s1}$ and $v_{s2}$ and hence $V_{th1}$, $V_{th2}$, and $V_{sat1}$ are all considered as constant, but these values are actually variable depending on the ambient temperature (T), viewing angles to the element ($\phi$, $\theta$) and other factors (FIG. 4). In the above explanations for the formula (1) through formula (8), viewing angle $\phi$ defined in FIG. 4 is supposed to be 0, but actually such viewing angle may take a value within a limited range.

As viewed above, there are various factors that decide the operational margin (M). These factors are explained in due order hereinbelow, but it will be convenient for understanding such factors and the essence of the problem to give particular considerations to the following three essential elements:

(i) variation of threshold voltage with change of temperature (ii) variation of threshold voltage with change of angle (iii) sharpness of voltage-brightness characteristic.

The relation between (i)-(iii) and operational margin (M) will be clarified quantitatively by means of actual measurements.

Figure 5:
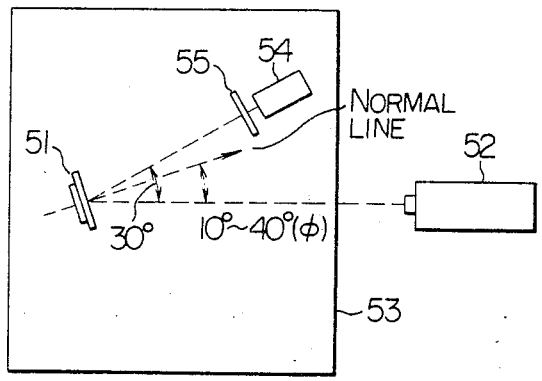
FIG. 5 is a schematic view of an apparatus for measuring the electro-optical properties of the composition.

The electro-optical characteristics of the time-division driving system are determined by the method illustrated in FIG. 5. A liquid crystal display element 51 is placed in a constant-temperature tank 53 with an inclination between 10° and 40° to the luminometer 51, and light is applied to said display element 51 through a heat-absorbing glass filter 55 from a tungsten lamp 54 disposed with an angle of 30° to the luminometer 52, and the brightness of said element 51 is measured by the luminometer 52.

Figure 6:
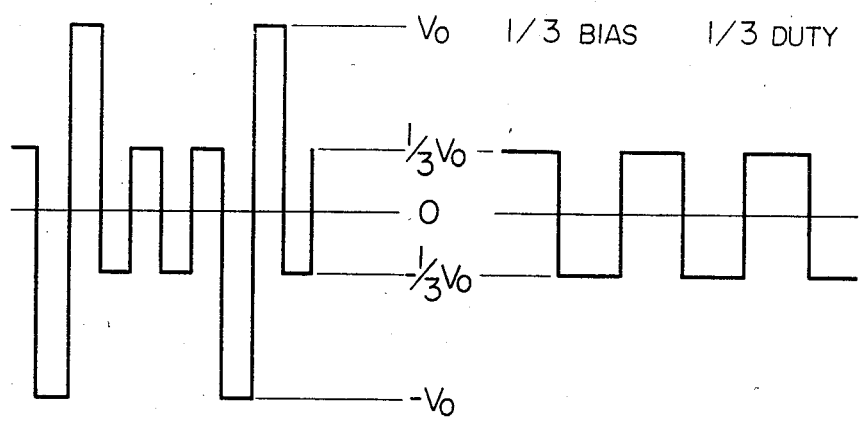
FIG. 6 shows the ⅓ bias, ⅓ duty driving waveforms.
Figure 7:
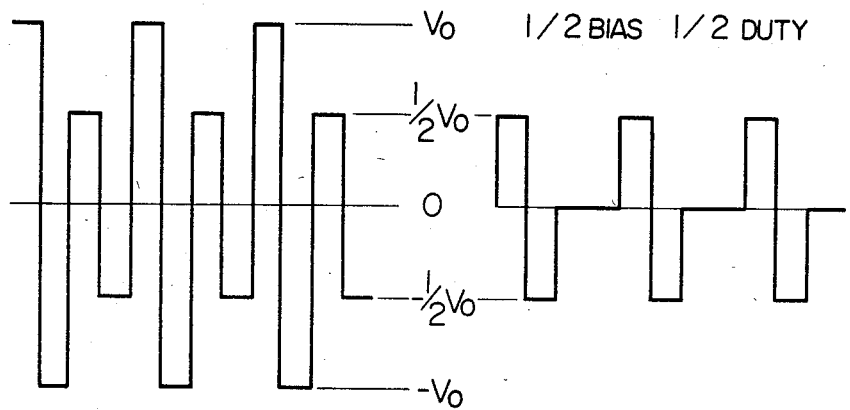
FIG. 7 shows the ½ bias, ½ duty driving waveforms.

The driving wave forms in the case of ⅓ bias, ⅓ duty and ½ bias, ½ duty time-division driving as measured by the above-said method are as shown in FIGS. 6 and 7. FIG. 8 shows the voltage-brightness characteristics as determined from these wave forms. FIG. 8, region I is the area where the display is not lighted, and region II is the area where the display is lighted only at the selected segments. Desired display of figures, letters, etc., can be made in the region II. Region III is the area where all the segments are lighted and no display function is performed, that is, cross-talk occurs. In the drawing, $V_{th1}$ is voltage at selected segment (ON mode) of 10% brightness, $V_{th2}$ is voltage at non-selected segment (OFF mode) of 10% brightness, $V_{sat1}$ is 50% brightness selected segment voltage, and $V_{sat2}$ is 50% brightness non-selected segment voltage.

The operational margin (M) is defined by the following formula:

$$M(\%) = \frac{\{V_{th2}(T=40, \phi=40°, f=100) - V_{sat1}(T=0, \phi=10°, f=550)\}}{\{V_{th2}(T=40, \phi=40°, f=100) + V_{sat1}(T=0, \phi=10°, f=550)\}} \times 100 \quad (9)$$

wherein
T = temperature (°C.) 0°–40° C.
$\phi$ = viewing angle (°) 10°–40°
f = frequency (Hz) 100–550 Hz
Therefore, "broad operational margin" is synonymous with "broad region II". Thus, the time-division driving system must be driven in a certain range of voltage margin.

Further analysis of the operational margin (M) given by the formula (9) shows that M is decided by the aforesaid three factors (i)–(iii), and these factors are quantatively defined by the following formulae:
(i) Temperature characteristic $\Delta T$ of $V_{th}$:

$$\Delta T = \frac{V_{th2}(T=0°\text{ C.}) - V_{th2}(T=40°\text{ C.})}{V_{th2}(T=0°\text{ C.}) - V_{th2}(T=40°\text{ C.})} \times 100 \; (\%) \quad (10)$$

The definition is made under the following conditions: T = 0°–40° C., $\phi$ = 40°, f = 100 Hz.
(ii) Angle dependency $\Delta\phi$ of $V_{th}$:

$$\Delta\phi = \frac{V_{th2}(\phi=40°)}{V_{th2}(\phi=10°)} \quad (11)$$

at T = 40° C., f = 100 Hz.
(iii) Sharpness $\gamma$ of voltage-brightness characteristic $$\gamma = V_{sat1}/V_{th1} \quad (12)$$

Although these three factors (i)–(iii) are the principal elements, usually frequency characteristic $\Delta f$ should be also taken into consideration as additional factor.

$$\Delta f = V_{th1}(f=550)/V_{th1}(f=100) \quad (13)$$

$\Delta f$ was defined under the conditions of T = 40° C. and $\phi$ = 40°.
The margin $\alpha$ of the voltage-averaging method is defined as follows for convenience of derivation of formulae:

$$\alpha = V_{th2}/V_{th1} \quad (14)$$

Substituting the formulae (10)–(14) for the formula (9), operational margin M is given as:

$$M = \frac{1 - \left(\frac{\gamma}{\Delta\phi}\right)\frac{\Delta f}{\alpha \cdot A}}{1 + \left(\frac{\gamma}{\Delta\phi}\right)\frac{\Delta f}{\alpha \cdot A}} \quad (15)$$

wherein $A = \frac{1 - \Delta T}{1 + \Delta T}$

Generally, $\gamma$, $\Delta\phi$, $\Delta T$ and $\Delta f$ may be defined as follows: $\gamma \geq 1$, $\Delta\phi \leq 1$, $\Delta T \geq 0$ and $\Delta f \leq 1$.
The hereabove defined operational margin may vary over a wide range depending on the liquid crystal compound used, but it is noticed that the compound capable of giving a greater margin is suited for time-division driving. As apparent from the formula (15), it is required for enlarging the operational margin M to make temperature characteristic $\Delta T$ approach zero as much as possible and to make the angle dependency $\Delta\phi$, voltage-brightness sharpness and frequency characteristic $\Delta f$ approach as close to 1 as possible. In some cases, the effect of the temperature characteristic may be made almost ignorable in enlarging the operational margin by incorporating a temperature compensation circuit in the device. However, provision of such temperature compensation circuit necessarily leads to an elevated manufacturing cost of the device, so that it is desirable to employ the parts (elements) which can provide a wide operational margin with no extra condition such as provision of a compensation circuit, particularly in the case of the popularly used devices such as table-type electronic computers.

As for the third requirement, namely, good responsiveness over a wide temperature range, particularly at low temperatures, the following consideration will be instructive. Generally, responsiveness in the twisted nematic mode for time-division driving is given by the following formulae:

$$t_{rise} \propto \frac{1}{\left(\frac{8}{N}+1\right)} \cdot \frac{\eta \cdot d^2}{K} \quad (16)$$

$$t_{fall} \propto d^2 \eta / K \quad (17)$$

$\eta$: viscosity
K: elastic constant (refer to formula (20) shown later)
d: liquid crystal layer thickness
It is noticed from the above formulae that liquid crystal responsiveness is decided mostly by viscosity of the liquid crystal material. It is said that these theoretical formulae well agree with actual measurements, and it is apparent to those skilled in the art that improvement of responsiveness can be attained by properly adjusting the viscosity of the liquid crystal compound used.

Thus, fulfillment of the third requirement depends on whether a liquid crystal compound having a low viscosity (and of course meeting the first and second requirements) can be found or not.

Among the compounds of the formula (I) used as the component (a) of the liquid crystal composition of this invention, the following are most preferred:

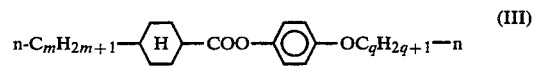
(III)

(wherein m and q are each an integer of 1 to 10).
As for the combinations of m and q in the above formula (III), the following combinations are preferred:
(3, 5), (4, 5), (5, 5) (6, 5), (4, 6), (3, 1), (3, 2), (3, 3), (3, 4), (3, 9), (4, 1), (4, 2), (4, 3), (4, 4), (4, 6), (4, 8), (5, 1), (5, 2), (5, 3), (5, 4), (5, 6), (5, 7), etc.

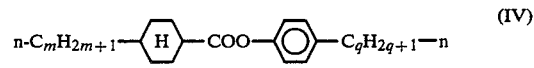
(IV)

(wherein m and q are each an integer of 1 to 10).
In the above formula (IV), the (m, q) combinations of (5, 2), (5, 3), (5, 5) and such are preferred.

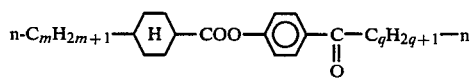

(wherein m and q are each an integer of 1 to 10).
The preferred (m, q) combinations in the above formula are (3, 4), (4, 4), (4, 1), (5, 4), (5, 9), etc.

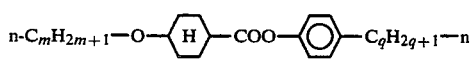

(wherein m and q are each an integer of 1 to 10).
The preferred (m, q) combinations are (5, 3), (5, 5), etc.

As for the compounds of the formula (II) used as component (b) in the composition of this invention, those having the following substituents are most preferred: ($R_3=C_2H_5$, $R_4=CH_3$), ($R_3=C_2H_5$, $R_4=n-C_4H_9$), ($R_3=n-C_3H_7$, $R_4=n-C_5H_{11}$), ($R_3=n-C_4H_9$, $R_4=n-C_4H_9$), ($R_3=n-C_5H_{11}$, $R_4=n-C_5H_{11}$), ($R_3=n-C_7H_{15}$, $R_4=n-C_5H_{11}$), ($R_3=CH_3$, $R_4=C_2H_5O$), ($R_3=CH_3$, $R_4=n-C_8H_{17}O$), ($R_3=C_2H_5$, $R_4=CH_3O$), ($R_3=n-C_4H_9$, $R_4=CH_3O$), ($R_3=n-C_4H_9$, $R_4=C_2H_5O$), ($R_3=n-C_4H_9$, $R_4=n-C_6H_{13}O$), ($R_3=n-C_5H_{11}$, $R_4=n-C_8H_{17}O$), ($R_3=n-C_6H_{13}$, $R_4=n-C_6H_{13}O$), ($R_3=CH_3O$, $R_4=C_2H_5$), ($R_3=CH_3O$, $R_4=n-C_3H_7$), ($R_3=n-C_5H_{11}O$, $R_4=n-C_3H_7$), ($R_3=CH_3O$, $R_4=n-C_4H_9$), ($R_3=C_2H_5O$, $R_4=n-C_4H_9$), ($R_3=n-C_4H_9O$, $R_4=n-C_4H_9$), ($R_3=n-C_{10}H_{21}O$, $R_4=n-C_4H_9$), ($R_3=n-C_4H_9$, $R_4=n-C_5H_{11}$), ($R_3=n-C_5H_{11}O$, $R_4=n-C_5H_{11}$), ($R_3=CH_3O$, $R_4=n-C_8H_{17}$). In the foregoing compounds, a carbon in the cyclohexane ring and that of the carbonyl group are bonded by equatorial conformation.

It is desirable that each of the compounds of the formula (I) and the compounds of the formula (II) has itself a wide range of MR (mesomorphic range) in order that the mixed system of the compounds of said both formulae may well serve as a system which meets the afore-said second and third requirements.

MR of the principal Nn single liquid crystal compounds 4-n-alkyl-cyclohexanecarboxylic acid-trans-4'-alkoxyphenyl esters are shown in Table 1 below.

TABLE 1

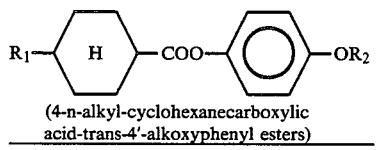

(4-n-alkyl-cyclohexanecarboxylic acid-trans-4'-alkoxyphenyl esters)

| Symbol | $R_1$ | $R_2$ | MR (°C.) |
|---|---|---|---|
| A | $C_3H_7$ | $C_5H_{11}$ | 37–67 |
| B | $C_4H_9$ | $C_5H_{11}$ | 26–67 |
| C | $C_5H_{11}$ | $C_5H_{11}$ | 31–77 |
| D | $C_6H_{13}$ | $C_5H_{11}$ | 44–52 |
| E | $C_4H_9$ | $C_6H_{13}$ | 25–69 |
| F | $C_3H_7$ | $CH_3$ | 55–64 |
| G | $C_3H_7$ | $C_3H_7$ | 54–65 |
| H | $C_4H_9$ | $CH_3$ | 42–61 |
| I | $C_4H_9$ | $C_2H_5$ | 36–74 |
| J | $C_4H_9$ | $C_6H_{13}$ | 26–70 |
| K | $C_5H_{11}$ | $C_2H_5$ | 56–86 |
| L | $C_5H_{11}$ | $C_4H_9$ | 48–80 |

Suitable mixing of these compounds gives the mixed systems with fairly wide MR as shown in Table 2 below.

TABLE 2

| Sign | Nn liquid crystals, Figure in parentheses: mol % | MR (°C.) |
|---|---|---|
| 1-1 | A(50) + C(50) | 13–70 |
| 1-2 | C(50) + E(50) | 17–71 |
| 1-3 | A(50) + E(50) | 12–65 |
| 1-4 | A(50) + C(25) + E(25) | 9–69.5 |
| 1-5 | A(33.3) + C(33.3) + E(33.3) | 11–70 |
| 1-6 | A(33.3) + B(33.3) + C(33.3) | 15–69 |
| 1-7 | D(50) + K(50) | 13–81 |
| 1-8 | B(50) + K(50) | 15–78 |
| 1-9 | B(50) + D(50) | 21–69 |
| 1-10 | A(50) + K(50) | 21–77 |
| 1-11 | C(50) + K(50) | 15–81 |

Table 3 below shows MR of some typical examples of the compounds represented by the general formula:

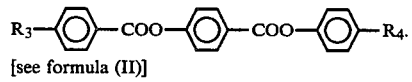

[see formula (II)]

TABLE 3

| Sign | $R_3$ | $R_4$ | MR (°C.) |
|---|---|---|---|
| a-1 | $CH_3$ | $n-C_5H_{11}$ | 105–199.5 |
| a-2 | $C_2H_5$ | $n-C_4H_9$ | 93–189 |
| a-3 | $n-C_3H_7$ | $n-C_5H_{11}$ | 78–188 |
| a-4 | $n-C_4H_9$ | $n-C_4H_9$ | 89–183 |
| a-5 | $n-C_5H_{11}$ | $n-C_5H_{11}$ | 78–179.5 |
| a-6 | $n-C_7H_{15}$ | $n-C_5H_{11}$ | (Solid-smectic-nematic) 76–103.5–168.5 |
| b-1 | $CH_3$ | $C_2H_5O$ | 150–257 |
| b-2 | $CH_3$ | $n-C_8H_{17}O$ | 113–193 |
| b-3 | $C_2H_5$ | $CH_3O$ | 134–230 |
| b-4 | $n-C_4H_9$ | $CH_3O$ | 134–224 |
| b-5 | $n-C_4H_9$ | $C_2H_5O$ | 138–225 |
| b-6 | $n-C_4H_9$ | $n-C_6H_{18}O$ | 92–187 |
| b-7 | $n-C_5H_{11}$ | $n-C_3H_{17}O$ | 87–182 |
| b-8 | $n-C_6H_{13}$ | $n-C_6H_{13}O$ | 89–177 |
| c-1 | $CH_3O$ | $C_2H_5$ | 136–230 |
| c-2 | $CH_3O$ | $n-C_3H_7$ | 110–230 |
| c-3 | $n-C_5H_{11}O$ | $n-C_3H_7$ | 115–209 |
| c-4 | $CH_3O$ | $n-C_4H_9$ | 107–235 |
| c-5 | $C_2H_5O$ | $n-C_4H_9$ | 124–231 |
| c-6 | $n-C_4H_9O$ | $n-C_4H_9$ | 113–212 |
| c-7 | $n-C_{10}H_{21}O$ | $n-C_4H_9$ | 91–172 |
| c-8 | $CH_3O$ | $n-C_5H_{11}$ | 87–223 |
| c-9 | $n-C_4H_9O$ | $n-C_5H_{11}$ | 89–209.5 |
| c-10 | $n-C_5H_{11}O$ | $n-C_5H_{11}$ | 91–198.5 |
| c-11 | $CH_3O$ | $n-C_8H_{17}$ | 90–195 |

Tables 4 and 5 below show MR of the mixed systems of the compounds of the formula (I) (component (a)) and the mixed systems of the compounds of the formula (II) (component (b)).

TABLE 4-1

| Run No. | FK-1 (wt %) | DE-1 (wt %) | MR (°C.) |
|---|---|---|---|
| A-1 | 95 | 5 | −1–77 |
| A-2 | 90 | 10 | 3–83 |
| A-3 | 80 | 20 | 6–94 |

TABLE 4-1-continued

| Run No. | FK-1 (wt %) | DE-1 (wt %) | MR (°C.) |
| --- | --- | --- | --- |
| A-4 | 70 | 30 | 15–105 |

Note
FK-1:

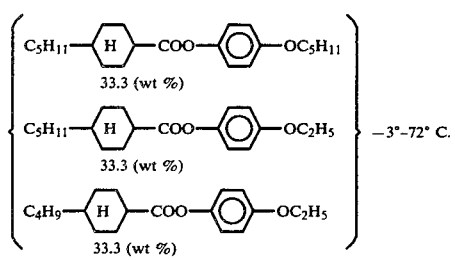

DE-1:

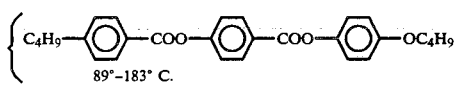

TABLE 4-2

| Run No. | FK-1 (wt %) | DE-2 (wt %) | MR (°C.) |
| --- | --- | --- | --- |
| B-1 | 95 | 5 | 0–77 |
| B-2 | 90 | 10 | 2–84 |
| B-3 | 80 | 20 | 8–96 |
| B-4 | 70 | 30 | 20–108 |

DE-2:

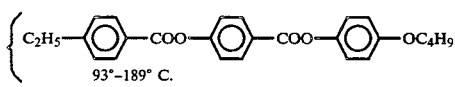

TABLE 5-1

| Run No. | FK-2 (wt %) | DE-1 (wt %) | MR (°C.) |
| --- | --- | --- | --- |
| C-1 | 95 | 5 | 2–79 |
| C-2 | 90 | 10 | 3–85 |
| C-3 | 80 | 20 | 7–96 |
| C-4 | 70 | 30 | 21–107 |

FK-2:

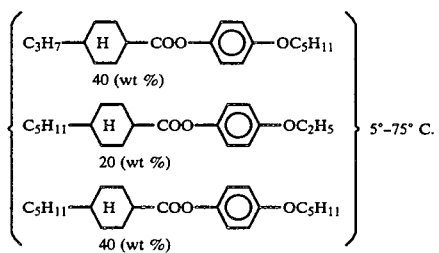

TABLE 5-2

| Run No. | FK-3 (wt %) | DE-1 (wt %) | MR (°C.) |
| --- | --- | --- | --- |
| D-1 | 95 | 5 | −2–68 |
| D-2 | 90 | 10 | −1–74 |
| D-3 | 80 | 20 | 3–80 |

TABLE 5-2-continued

| Run No. | FK-3 (wt %) | DE-1 (wt %) | MR (°C.) |
| --- | --- | --- | --- |
| D-4 | 70 | 30 | 10–86 |

FK-3:

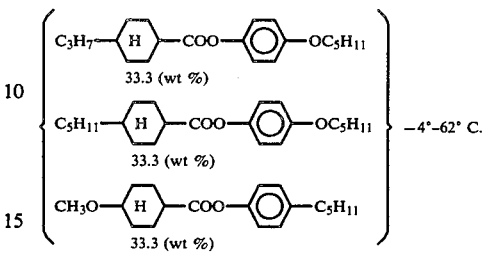

As seen from these tables, the upper limit of MR rises up in accordance as a compound (or compounds) of the formula (II) is added to one or more of the compounds of the formula (I). In some cases, the lower limit also rises slightly. In various combinations of the compounds, MR becomes the maximum when the compound of the formula (II) is added in an amount of about 10 to 20% by weight as shown in Tables 4 and 5. It will be also appreciated that addition of a compound (or compounds) of the formula (II) allows obtainment of a mixed liquid crystal system with wide MR. The rise of the upper limit of MR is usually proportional to the loading of the compound of the formula (II), but in view of increase of viscosity of the mixed system and other related factors, it is advisable to add said compound in an amount of not less than 2% by weight but not exceeding 30% by weight. Best results are obtained when said compound loading is within the range of 15±7% by weight.

Figure 1:
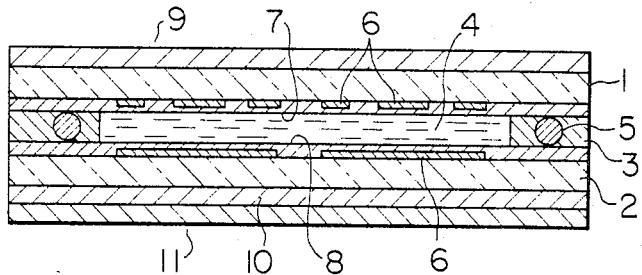
FIG. 1 is a sectional view showing an example of liquid crystal display element.

In case of using these mixed liquid crystal systems for the field-effect type twisted nematic liquid crystal display elements, it is essential that the dielectric anisotropy of the mixed liquid crystal system is positive, that is to say, $\epsilon_\parallel \epsilon_\perp (= \Delta\epsilon)$ is positive. FIG. 1 shows an example of twisted nematic type (TN type) liquid crystal display elements which are among the field-effect type liquid crystal display elements. The liquid crystal display element shown in FIG. 1 comprises a first substrate 1 and a second substrate 2 both of which are made of transparent glass or other like material and arranged substantially parallel to each other with a predetermined spacing, for example 5 to 15 μm, and sealed at the periphery with a sealant 3 such as frit glass or an organic adhesive, and a nematic liquid crystal 4 encapsulated therein. The predetermined spacing may be provided by placing a spacer 5 made of fiber glass, glass powder or such. The sealant 3 may be so designed as to double as spacer.

Electrodes 6 of a predetermined pattern are formed on the internal opposing sides of said first and second substrates 1 and 2, and the faces contacted with the liquid crystal are worked into liquid crystal controlling planes 7 and 8 where the liquid crystal molecules in the vicinity of these planes are oriented in a given direction. Such orientation controlling planes can be formed by coating the electrode-carrying side of each substrate with an oblique vacuum vaporization film of SiO or with an organic high-molecular film or a film of an inorganic material, and rubbing the coated surface in a given direction with cotton or other means.

Figure 2:
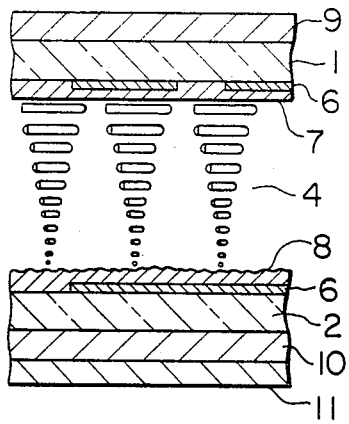
FIG. 2 is a structural diagram showing the orientation pattern of liquid crystal molecules.

The liquid crystal orientation controlling planes 7 and 8 of the first and second substrates 1 and 2 are differentiated in the liquid crystal orienting direction so that the molecules of the nematic liquid crystal 4 disposed between said both substrates 1 and 2 will be oriented twistedly from one direction (first direction on the controlling plane 7) to the other direction (second direction on the controlling plane 8). The angle made by the first and second directions, namely, the angle of twist of the liquid crystal molecules may be suitably selected, but usually such angle is defined to be about 90° as shown in FIG. 2.

A first polarizer 9 and a second polarizer 10 are disposed on the outside of the substrates 1 and 2, respectively. These two polarizers 9, 10 are usually arranged such that the angle made by their respective axes of polarization will be equal to the twist angle of the liquid crystal molecules (the angle made by said first and second orientation directions) or will be zero (in this case the respective axes of polarization are parallel to each other), and that the axis of polarization of each polarizer will be parallel to or cross at right angles with the liquid crystal orienting plane of the associated substrate.

Such display element is widely utilized as a reflection type display element by providing a reflector 11 on the back side of the second polarizer 9 for effectuating normal display as seen from the first substrate side, or as a night-time display element by further incorporating a photoconductor made of an acrylic resin, glass or the like with a suitable thickness between the second polarizer 9 and reflector 11 and placing a light source on a suitable location on a side of said photoconductor.

Here, the operational principle of a reflection type liquid crystal display element arranged with 90° twist angle and 90° polarization axes crossing angle is described.

In case no electric field is present in the liquid crystal layer, the incoming light (ambient light incident upon the first polarizer 9 of the liquid crystal display element) is transmitted through the first polarizer 9 to become rectilinear polarized light running along the axis of polarization and enters the liquid crystal layer, but since the liquid crystal molecules are twisted 90° in said layer, the plane of polarization of the polarized light is optically rotated by 90° upon passage of the light through the liquid crystal layer, and then the polarized light passes the second polarizer 10. This polarized light is then reflected on the reflector 11 and transmitted reversely through the second polarizer 10, liquid crystal layer 4 and first polarizer 9 in that order and finally emanated out of the liquid crystal display element. Thus, the observer can see the polarized light which has entered the liquid crystal display element and again comes out of said element after reflected by the reflector.

On the other hand, when a predetermined voltage is applied to a certain selected electrode 6 to give an electric field in a certain area of the liquid crystal layer in said display element, the liquid crystal molecules in that area are oriented in the direction of the electric field, and as a result, such area of the liquid crystal layer is deprived of its optical rotating capacity for the polarization plane and hence the plane of polarization in said area undergoes no optical rotation, so that the light polarized by the first polarizer is intercepted by the second polarizer and therefore that area looks dark to the observer.

It is thus possible to effect desired display by applying an electric voltage to a pertinent electrode.

It is not difficult to impart positive dielectric anisotropy to said mixed liquid crystal systems by property modification. The liquid crystal composition of this invention, i.e. the mixed system of the compounds of the formulae (I) and (II), has negative dielectric anisotropy, but such negative anisotropy can be converted into positive by adding a relatively small quantity of a nematic liquid crystal (Np) with strongly positive dielectric anisotropy or its homologue without much affecting the desirable properties, such as wide mesomorphic range, low viscosity, etc., possessed by the mixed system having the components (a) and (b).

As preferred examples of the Np type liquid crystals and/or the homologues thereof used as component (c) in the composition of this invention, the following may be cited:

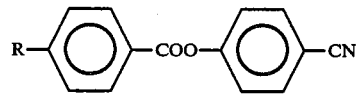

R: n—$C_mH_{2m+1}$ or n—$C_mH_{2m+1}$—O; m: an integer of 1-10; n: as defined above.

Examples

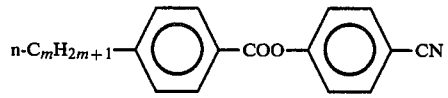

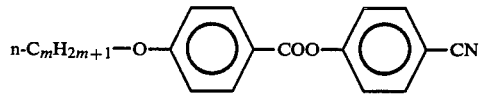

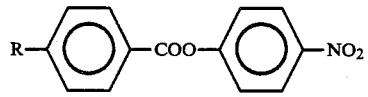

R, m and n: as defined above.

Examples

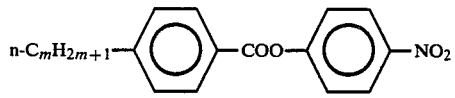

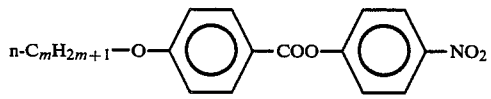

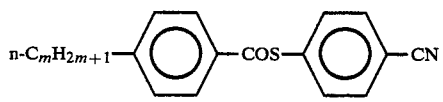

m, n: as defined above.

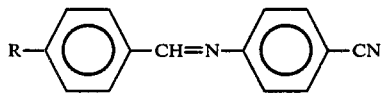

R: n—$C_mH_{2m+1}$, n—$C_mH_{2m+1}$—O or n—$C_mH_{2m+1}$—COO; m and n: as defined above.

Examples

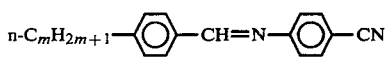

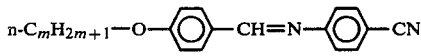

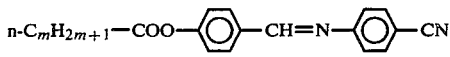

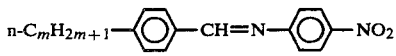

m and n: as defined above.

R: n—$C_mH_{2m+1}$, n—$C_mH_{2m+1}$—O or n—$C_mH_{2m+1}$—COO; m and n: as defined above.

Examples

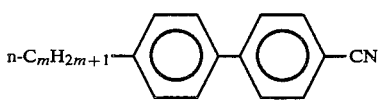

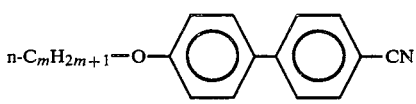

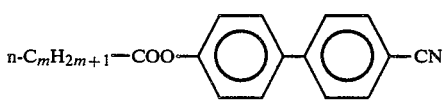

R: n—$C_mH_{2m+1}$ or n—$C_mH_{2m+1}$—O; m and n: as defined above.

Examples

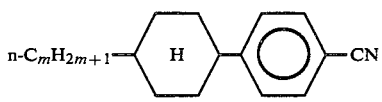

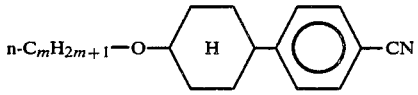

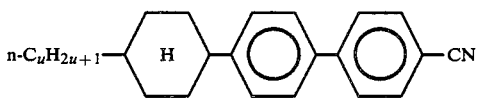

u: an integer of 1–8; n: as defined above.

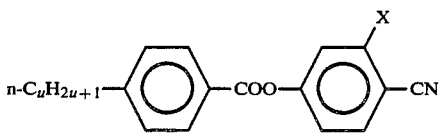

u: an integer of 1–8; X: a halogen (F, Br, Cl or I); n: as defined above.

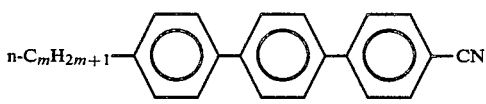

m and n: as defined above.

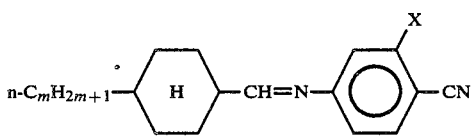

m, n, X: as defined above.

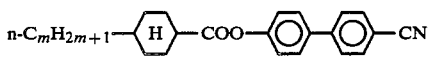

m and n: as defined above.

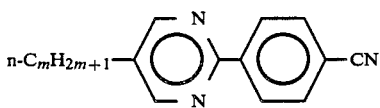

m and n: as defined above.

These compounds are added either singly or in admixture as component (c) to the mixed system which contains said components (a) and (b). The following general facts or rules may be the guiding principle for deciding the amount of the component (c) to be added. That is, the amount of the Np type liquid crystal and/or its homologues to be mixed as component (c) in the Nn type liquid crystal is decided by the working threshold voltage required by the mixed system. The relation between the amount of the component (c) to be mixed and working threshold voltage is determined substantially according to the following conceptions. The threshold voltage (Vth) of the twisted nematic liquid crystal element is given by the following formula:

$$(4\pi)^{-1}(\epsilon_\| - \epsilon_\perp)V_{th}^2 = \pi^3 \cdot K_{11} + (K_{33} - 2K_{22})\phi^2 \quad (18)$$

wherein $\phi$ is twist angle which is usually $\#/2$, and $K_{11}$, $K_{22}$ and $K_{33}$ are elastic constants of splay, twist and bend, respectively. The above formula (18) may be simplified as:

$$V_{th} = 2\pi^{2/3} \cdot (K/\Delta\epsilon)^{\frac{1}{2}} \quad (19)$$

wherein $\Delta\epsilon = \epsilon_\| - \epsilon_\perp$ $$K = K_{11} + \tfrac{1}{4}(K_{33} - 2K_{22}) \quad (20)$$

It is possible, in principle, to obtain a liquid crystal with desired $\Delta\epsilon$ by mixing the liquid crystals with different values of $\Delta\epsilon$. Let it be assumed here that dielectric constants of the two different kinds of liquid crystals A and B are $\epsilon_\|^A$ and $\epsilon_\perp$, respectively, and the mixing ratio thereof is $A/B = X(1-X)$, then if additivity of the dielectic constants applies here, $\Delta\epsilon$ of the mixed system is given by the following formula:

$$\Delta\epsilon = X\Delta\epsilon^A + (1-X)\Delta\epsilon^B = X(\Delta\epsilon^A - \Delta\epsilon^B) + \Delta\epsilon^B \quad (21)$$

Also, if it is supposed that additivity applies for K, too, then K of the mixed liquid crystal is given by the following formula:

$$K = XK^A + (1-X)K^B = X(K^A - K^B) + K^B \quad (22)$$

Introducing the formulae (21) and (22) into the formula (19), $$V_{th} = \frac{2\pi^{\frac{3}{2}} \sqrt{X(K^A - K^B) + K^B}}{\sqrt{X(\Delta\epsilon^A - \Delta\epsilon^B) + \Delta\epsilon^B}} \quad (23)$$

The threshold voltage may be calculated in the following way by giving the definite figures to the respective constants.

Let it be assumed that $\Delta\epsilon^B$ of the Nn type liquid crystal is $-0.3$, $\Delta\epsilon^A$ of the Np type liquid crystal

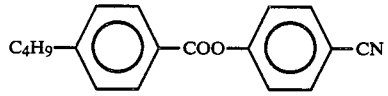

is 25, $K^B$ is $4 \times 10^{-7}$ dyne and $K^A$ is $17 \times 10^{-17}$ dyne, then the formula (23) gives:

$$V_{th} = \frac{2\pi^{\frac{3}{2}} \sqrt{(13X + 4)10^{-7}}}{\sqrt{25.3X - 0.3}} \quad (24)$$

It will be apparent to those skilled in the art that above assignment of figures to $\Delta\epsilon^A$, $\Delta\epsilon^B$, $K^A$ and $K^B$ are not arbitrary but well conform to the actual properties of the liquid crystal.

Figure 9:
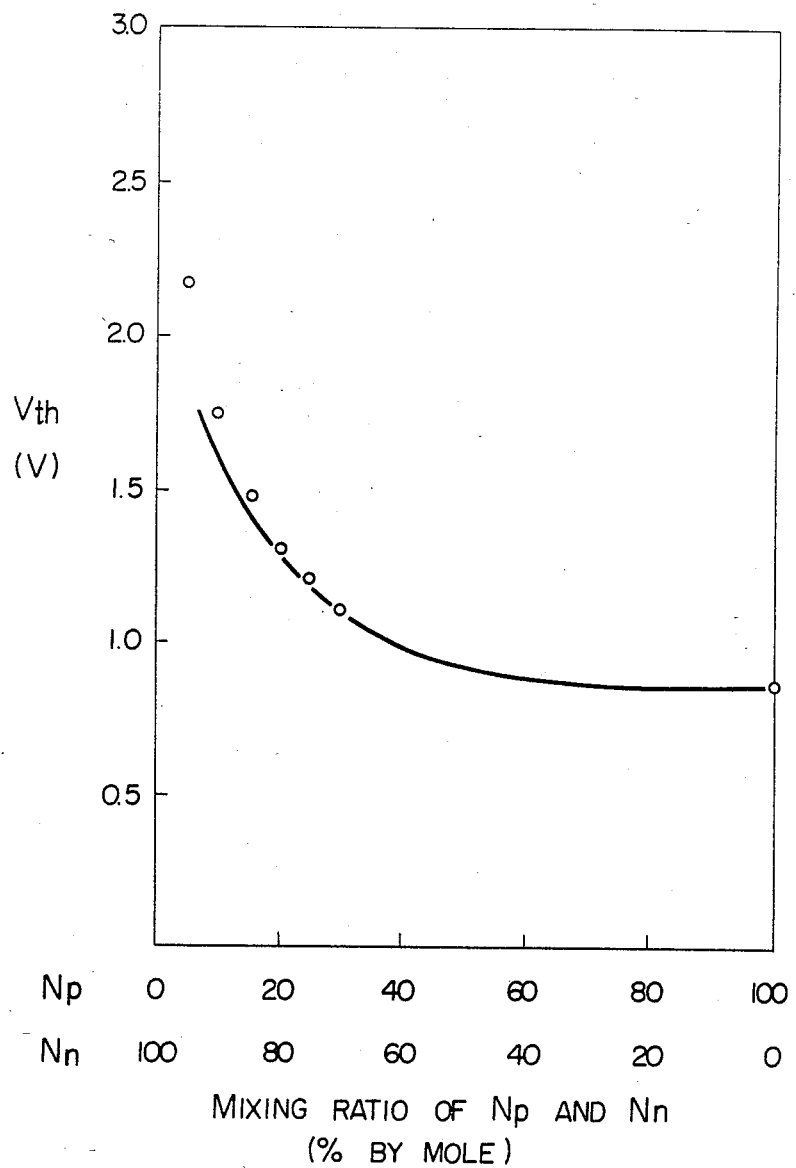
FIG. 9 is a characteristic diagram showing the relation between $N_p/N_n$ mixing ratio and $V_{th}$.

FIG. 9 shows the relation between mixing ratio and value of Vth (static drive) in case the Np and Nn type liquid crystals were mixed by using

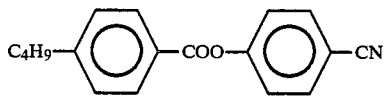

as Np type liquid crystal and the mixture 1-4 of Table 2 as Nn type liquid crystal. The product of the theoretical formiula (calculation formula) (23) or (24) well agrees with the experimental results. Thus, component (c) is preferably mixed in an amount of not less than 4% by weight and not more than 70% by weight, more preferably 10 to 50% by weight, based on the total amount of the components (a), (b) and (c). More concretely, the components (a), (b) and (c) are used in the following proportions: (a) 10 to 80% by weight, (b) 2 to 30% by weight and (c) 4 to 70% by weight.

As the Np type liquid crystals, there are Schiff base type, ester type, pyrimidine type, biphenyl type, PCH type, and the like liquid crystals. These liquid crystals except for the Schiff base type, which cannot be used in an organic seal package due to chemical instability as mentioned above, can be divided into the following two groups:

(1) $N_P{}^S$ (Np type liquid crystals having strong polarity)

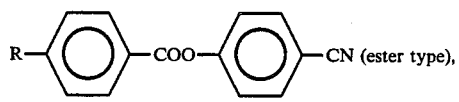

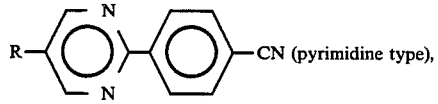

etc.

(2) $N_P{}^W$ (Np type liquid crystals having weak polarity)

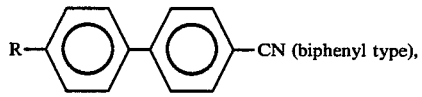

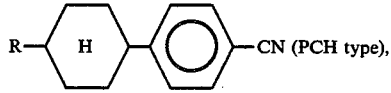

etc.

As mentioned above, a proper driving voltage can be adjusted by mixing a Nn type liquid crystal with a Np type liquid crystal. In order to obtain 3 V driving voltage, which is generally used, it is necessary to mix the Np type liquid crystal in an amount of 30% by weight or more. But in such a case, there arises a problem of compatibility between the Nn type liquid crystal and the Np type liquid crystal, particularly the $N_P{}^S$ type liquid crystal. In the case of mixing a small amount (20% by weight or less) of $N_P{}^S$ type liquid crystal with a Nn type liquid crystal, the resulting mixture can generally have a wide range of MR without causing the problem of compatibility. But when more than 20% by weight of $N_P{}^S$ type liquid crystal is mixed with a Nn type liquid crystal, the resulting mixture cannot be used practically due to a rise of $T_{C-N}$ point which is the lower limit of MR and deposition at normal temperatures and the like phenomena.

In order to solve these problems, there can be used the following method: that is, as the Np type liquid crystal to be mixed with the Nn type liquid crystal, not only a $N_P{}^S$ type liquid crystal but also a $N_P{}^W$ type liquid crystal are used. The resulting mixture has improved compatibility and can lower the driving voltage so as to provide 3 V driving. In other words, when 20-30% by weight of $N_P{}^W$ type liquid crystal is mixed with a liquid crystal system containing 20% by weight or less of $N_P{}^S$ type liquid crystal, MR can be broadened and the voltage can be lowered so as to provide 3 V driving.

This can be explained by the following examples.

(a) Mixed system of $Nn + N_P{}^S$

| | Margin | Central Voltage (V) | MR (°C.) |
|---|---|---|---|
| FK-3 (90% wt) $C_4H_9$—⌬—COO—⌬—CN (10% wt) | 10.5 | 6.0 | −15–64.0 |
| FK-3 (80% wt) $C_4H_9$—⌬—COO—⌬—CN (20% wt) | 9.0 | 4.5 | 10–61.0 |
| FK-3 (70% wt) $C_4H_9$—⌬—COO—⌬—CN (30% wt) | 5.0 | 3.5 | 25–57.8 |

(b) Mixed system of $Nn + N_P{}^S + N_P{}^W$

| | Margin | Central Voltage (V) | MR (°C.) |
|---|---|---|---|
| FK-3 (70% wt) $C_4H_9$—⌬—COO—⌬—CN (20% wt) $C_5H_{11}$—⟨H⟩—⌬—CN (10% wt) | 9.0 | 4.0 | −14–63 |
| FK-3 (60% wt) $C_4H_9$—⌬—COO—⌬—CN (20% wt) $C_5H_{11}$—⟨H⟩—⌬—CN (20% wt) | 8.5 | 3.4 | −20–62 |
| FK-3 (50% wt) $C_4H_9$—⌬—COO—⌬—CN (20% wt) $C_5H_{11}$—⟨H⟩—⌬—CN (30% wt) | 8.0 | 3.0 | −20–61 |

In the case of (a), when the $N_P{}^S$ type liquid crystal is mixed in proportion of 30% by weight, the characteristics can be measured under over-cooling state due to high $T_{C-N}$ point of 25° C., but there appears a rise of $V_{th}$ near 0° C. and temperature dependency of $V_{th}$ becomes great and margin becomes small. On the other hand, in the case of (b), these problems are solved by mixing the $N_P{}^W$ type liquid crystal at the same time and the voltage can be adjusted to 3 V.

A suitable composition of the mixed system of $Nn + N_P{}^S + N_P{}^W$ is as follows:

Nn: 10–80% by weight, preferably 20–60% by weight $N_P{}^S$: 2–30% by weight, preferably 5–20% by weight $N_P{}^W$: 2–40% by weight, preferably 5–30% by weight However, the above-said combination alone, that is, the combination of a compound of the formula (I), i.e. the component (a), a compound of the formula (II), i.e. the component (b), and an Np type liquid crystal or its homologue of the component (c), proves unsatisfactory in compatibility of the respective components. It is therefore advised to add, as fourth component (d), an Nn type, particularly polar Nn type compound (a polar Nn type liquid crystal compound and/or its homologue). The amount of this component (d) may be suitably decided according to the amount of the component (c), or an Np type liquid crystal and/or its homologue. Details of such amount will be shown in the Examples of this invention given later.

For improving compatibility of a non-polar Nn type liquid crystal system and a polar Np type liquid crystal and/or its homologue and for obtaining a wider MR, it is recommended to add an Nn type liquid crystal system of the type other than the above-said Nn type mixture system. Most preferable for attaining this end is use of a nematic liquid crystal compound having electric polarity in its molecules and also having negative dielectric anisotropy, or a homologue thereof. Preferred examples of such Nn type liquid crystal compounds and/or their homologues used as the component (d) are shown below.

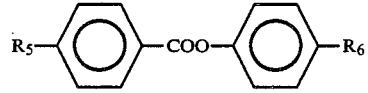

$R_5$: n—$C_mH_{2m+1}$, n—$C_mH_{2m+1}$—O, n—$C_mH_{2m+1}$—COO, or n—$C_mH_{2m+1}$—O—COO;

$R_6$: n—$C_qH_{2q+1}$, O—n—$C_qH_{2q+1}$, COO—n—$C_qH_{2q+1}$ or O—COO—n—$C_qH_{2q+1}$; m, n and q: as defined above.

Examples

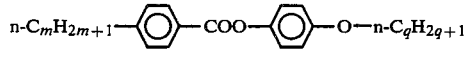

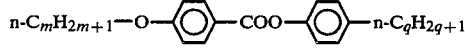

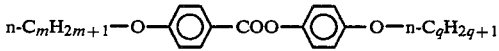

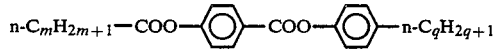

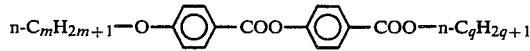

-continued

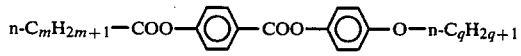

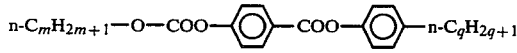

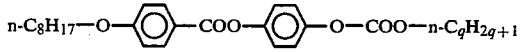

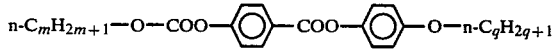

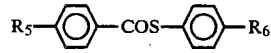

$R_5$: n—$C_mH_{2m+1}$ or n—$C_mH_{2m+1}$—O;
$R_6$: n—$C_qH_{2q+1}$ or n—$C_qH_{2q+1}$—O;
m, n and q: as defined above.

Examples

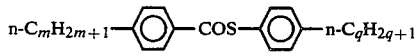

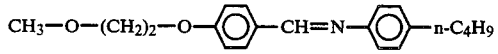

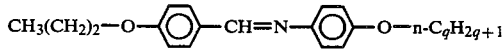

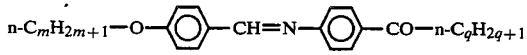

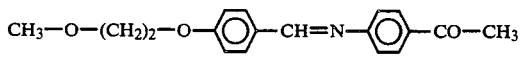

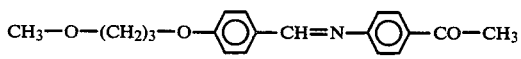

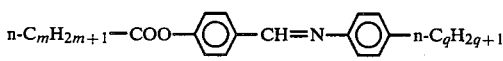

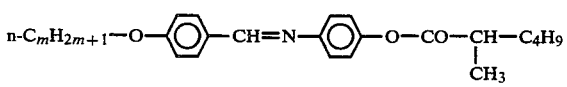

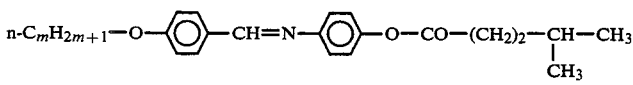

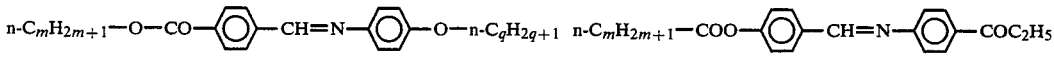

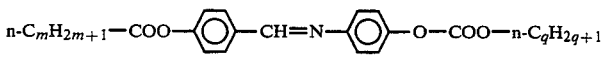

-continued

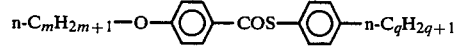

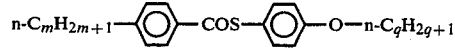

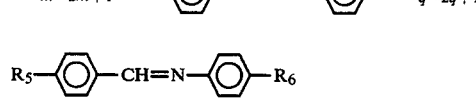

$R_5$: n—$C_mH_{2m+1}$, n—$C_mH_{2m+1}$—O, n—$C_mH_{2m+1}$—O—CO, $CH_3$—O—$(CH_2)_2$—O, $CH_3$—O—$(CH_2)_3$O, $CH_3$—O—$CH_2$—O, $C_2H_5$—O—$(CH_2)_2$—O, $C_2H_5$—O—$(CH_2)_3$—O, or $C_3H_7$—O—$(CH_2)_2$—O;

$R_6$: n—$C_qH_{2q+1}$, n—$C_qH_{2q+1}$—O, n—$C_qH_{2q+1}$—CO, n—$C_qH_{2q+1}$—COO, $$-CH-C_4H_9, -(CH_2)_2-CH-CH_3$$
$$\phantom{-}CH_3 \phantom{xxxxxxxx} CH_3$$

or n—$C_qH_{2q}$—O—CO;
m, n and q: as defined above.

Examples

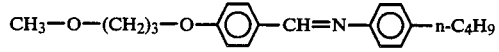

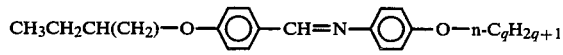

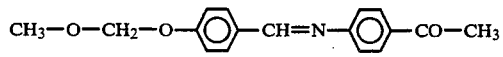

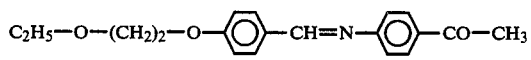

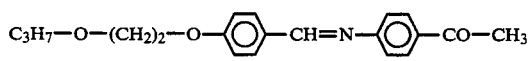

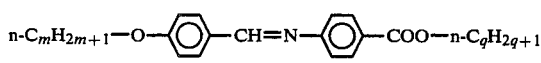

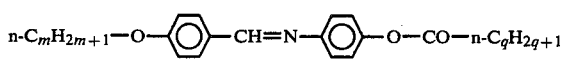

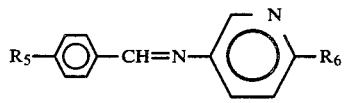

-continued $R_5$: n—$C_mH_{2m+1}$—O or n—$C_mH_{2m+1}$—COO;
$R_6$: n—$C_qH_{2q+1}$ or n—$C_qH_{2q+1}$—O;
m, n and q: as defined above.

Examples

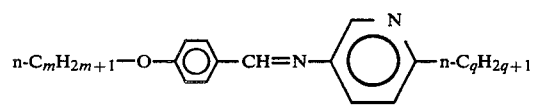

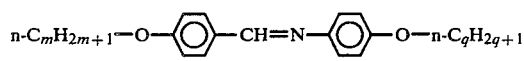

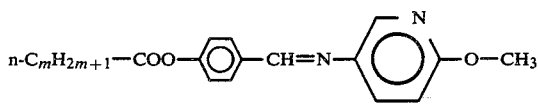

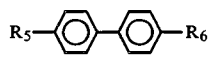

$R_5$: n—$C_mH_{2m+1}$, n—$C_mH_{2m+1}$—O, or n—$C_mH_{2m+1}$—CO;
$R_6$: n—$C_qH_{2q+1}$, n—$C_1H_{2q+1}$—O, n—$C_qH_{2q+1}$—CO or n—$C_qH_{2q+1}$—COO—;
n: as defined above.
m and q: as defined below.

Examples

m: an integer of 1–10.

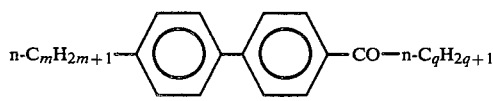

m: an integer of 1–10
q: an integer of 1–8

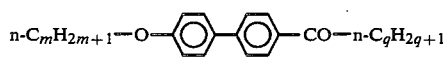

m: an integer of 1–12
q: an integer of 1–10

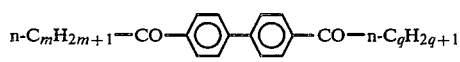

m, q: an integer of 1–10

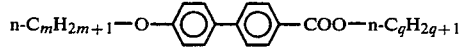

m: an integer of 1–18
q: an integer of 1–6

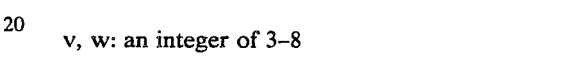

v, w: an integer of 3–8

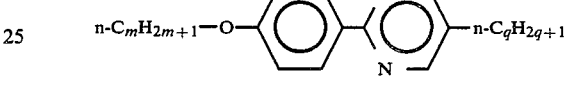

m, q: an integer of 1–10.

These compounds may be added either singly or in admixture of two or more to the said essential components (a), (b) and (c).

The components (a), (b), (c) and (d) are preferably used in the following proportions:
(a) 10 to 80% by weight,
(b) 2 to 30% by weight,
(c) 4 to 70% by weight, and
(d) 5 to 30% by weight.

Table 5-2 shows an example where FK-3 is used as mixed liquid crystal and

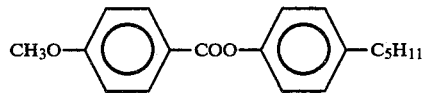

as Nn type liquid crystal. The resultant mixed liquid crystal system has a wide MR (−4° to 62° C.) and can well stand practical use. On the other hand, the system not added with said Nn type liquid crystal

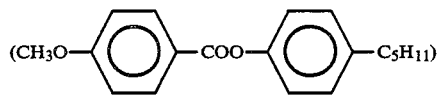

has its MR shifted to a higher temperature region, i.e. 13° to 70° C. as shown in 1-1 of Table 2, and this system is inferior in compatibility. Therefore, the amount of the Nn liquid crystal compound added as component (d) should preferably be within the range of 2 to 40% by weight. Particularly good result is obtained when the loading thereof is 20±10% by weight.

Table 6 below shows MR of the mixed liquid crystal systems prepared by adding an Np liquid crystal compound as component (c) to the mixed liquid crystal comprising a formula (I) compound (component (a)) and a formula (II) compound (component (b)). As seen from this table, the lower limit of MR tends to lower down when the Np liquid crystal loading is 5–10% by weight but tends to rise up when said loading is 20% by weight or more.

TABLE 6-1

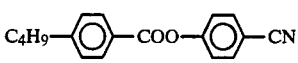

| Run No. | A - 2 (wt %) | (wt %) | MR (°C.) |
|---|---|---|---|
| 1 | 95 | 5 | −1-80 |
| 2 | 90 | 10 | −2-79 |
| 3 | 80 | 20 | 2-76 |
| 4 | 70 | 30 | 7-71 |

TABLE 6-2

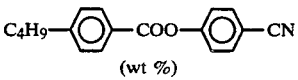

| Run No. | C - 2 (wt %) | (wt %) | MR (°C.) |
|---|---|---|---|
| 1 | 95 | 5 | −2-83 |
| 2 | 90 | 10 | −1-80 |
| 3 | 80 | 20 | 4-77 |
| 4 | 70 | 30 | 6-71 |

TABLE 6-3

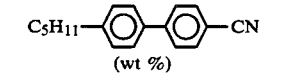

| Run No. | B - 2 (wt %) | (wt %) | MR (°C.) |
|---|---|---|---|
| 1 | 95 | 5 | −1-82 |
| 2 | 90 | 10 | −3-80 |
| 3 | 85 | 15 | −5-77 |
| 4 | 80 | 20 | −1-73 |

TABLE 6-4

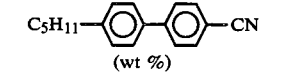

| Run No. | B - 2 (wt %) | (wt %) | MR (°C.) |
|---|---|---|---|
| 1 | 95 | 5 | 2-83 |
| 2 | 90 | 10 | −2-82 |
| 3 | 85 | 15 | −3-80 |
| 4 | 80 | 20 | −2-78 |

TABLE 6-5

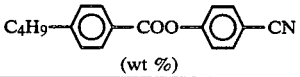

| Run No. | D - 2 (wt %) | (wt %) | MR (°C.) |
|---|---|---|---|
| 1 | 95 | 5 | 5-60 |
| 2 | 90 | 10 | −1-58 |
| 3 | 85 | 15 | 0-56 |
| 4 | 80 | 20 | 5-53 |

TABLE 6-6

| Run No. | D - 2 (wt %) | (wt %) | MR (°C.) |
|---|---|---|---|
| 1 | 95 | 5 | −1-60 |
| 2 | 90 | 10 | −2-57 |
| 3 | 85 | 15 | −2-55 |
| 4 | 80 | 20 | 2-52 |

TABLE 6-7

| Run No. | A - 2 (wt %) | X - 1 (wt %) | MR (°C.) |
|---|---|---|---|
| 1 | 90 | 10 | 0-78 |
| 2 | 80 | 20 | −1-74 |
| 3 | 60 | 40 | −4-63 |

TABLE 6-8

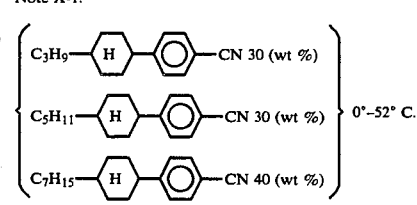

| Run No. | C-2 (wt %) | (wt %) | MR (°C.) |
|---|---|---|---|
| 1 | 95 | 5 | 0-85 |
| 2 | 90 | 10 | 5-85 |
| 3 | 80 | 20 | 11-85 |

Note X-1:

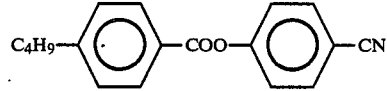

0°–52° C.

A-2, B-2, C-2 D-2 are as defined in TABLES 4-1, 4-2, 5-1 and 5-2.

Now, the time-division driving characteristics of the compositions of this invention are described by citing some examples of the compositions.

Figure 10:
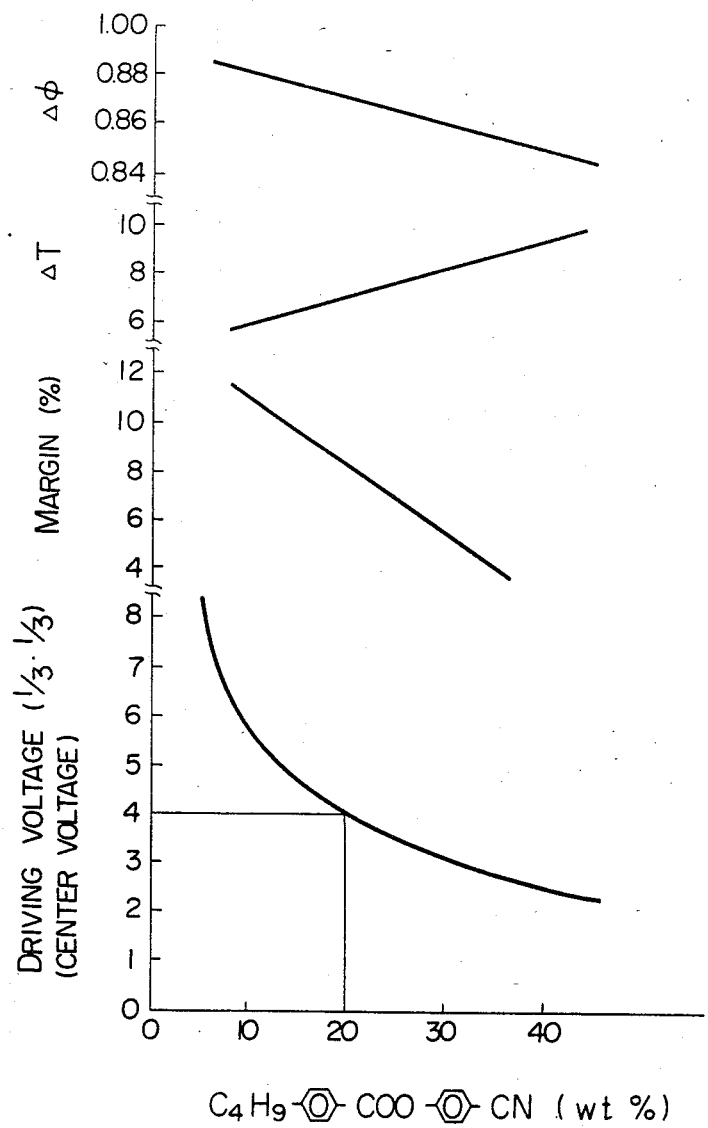

FIG. 10 shows the time-division driving characteristic as obtained when using a mixture of FK-3 (see Table 5-2) and

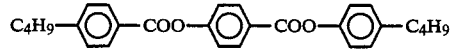

as Np type liquid crystal. It will be seen that $\Delta\epsilon(\epsilon_\parallel - \epsilon_\perp)$ rises up proportionally to the increase of the amount of Np liquid crystal, while the voltage drops gradually as $\Delta\epsilon$ rises up since there is the relation of $V_{th} = \sqrt{K/\Delta\epsilon}$, and low voltage driving (at 3 V, ⅓ bias, ⅓ duty) becomes possible. However, as regards the time-division characteristic, there is a tendency that the margin M diminishes as the voltage drops, and it lowers down to around 5% at 3 V, ⅓ bias and ⅓ duty driving. This is an unacceptable figure for actual use. Such diminishment of the margin is attributable to high temperature dependency ($\Delta T$) and high angle dependency ($\Delta\phi$) of $V_{th}$ as seen from FIG. 10.

FIG. 11 (Example 2) shows the characteristic given when a compound of the formula (II) according to this invention is added to the system of Example 1 said above. When the compound

C₄H₉—⟨O⟩—COO—⟨O⟩—COO—⟨O⟩—C₄H₉ is added in an amount of 0 to 15% by weight to the system of Example 1 added with 20% by weight of

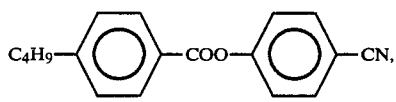

the margin rises up from about 8% to about 10.5% as the loading of said compound increases. Such rise of margin is caused as the fluctuation of ΔT (temperature dependency of Vth) is lessened from about 7% to about 4.5%. Generally, in case of adding long liquid crystal molecules having three benzene rings (such material has a high upper limit of MR), there results in rise of Vth and increased angle dependency (Δφ) of Vth as for instance seen in the embodiment of FIG. 12 where

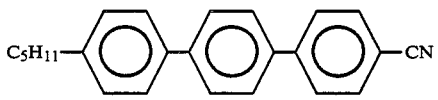

is used, so that such liquid crystal is unsuited for use as a low-voltage driving and high-margin material. On the other hand, the system added with the compound

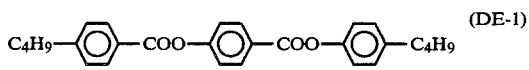

according to this invention allows low voltage driving with a high margin.

Table 7 below shows the time-division characteristic and responsiveness as obtained in Examples 2–5 by adding various compounds of formula (II) to the various mixed liquid crystal materials.

TABLE 7-1

| Example 2 | FK-3 (wt %) | C₄H₉—⟨O⟩—COO—⟨O⟩—CN (wt %) | DE-1 (wt %) | ⅓·⅓ Margin | Central voltage | ΔT | γ | Δφ | $t_r$ (25° C. Central 10 μm voltage) |
|---|---|---|---|---|---|---|---|---|---|
| 2-1 | 80 | 20 | 0 | 9.0 | 4.5 | 7.0 | 1.16 | 0.860 | 150 |
| 2-2 | 75 | 20 | 5 | 9.5 | 4.6 | 6.7 | 1.16 | 0.865 | 160 |
| 2-3 | 70 | 20 | 10 | 10.1 | 4.7 | 6.5 | 1.16 | 0.860 | 170 |
| 2-4 | 65 | 20 | 15 | 10.5 | 4.8 | 6.0 | 1.16 | 0.858 | 170 |

TABLE 7-2

| Example 3 | FK-2 (wt %) | C₄H₉—⟨O⟩—COO—⟨O⟩—CN (wt %) | C₇H₁₅—⟨H⟩—⟨O⟩—CN (wt %) | DE-1 (wt %) | ⅓·⅓ Margin | Central voltage | ΔT | γ | Δφ | $t_r$ (25° C. Central 10 μm voltage) |
|---|---|---|---|---|---|---|---|---|---|---|
| 3-1 | 55 | 25 | 20 | 0 | 7.0 | 3.0 | 8.5 | 1.15 | 0.840 | 130 |
| 3-2 | 50 | 25 | 20 | 5 | 7.4 | 3.1 | 8.1 | 1.15 | 0.836 | 140 |
| 3-3 | 45 | 25 | 20 | 10 | 8.0 | 3.1 | 7.7 | 1.15 | 0.838 | 150 |
| 3-4 | 40 | 25 | 20 | 15 | 8.3 | 3.2 | 7.2 | 1.15 | 0.840 | 150 |

TABLE 7-3

| Example 4 | FK-2 (wt %) | X-1 (wt %) | C₅H₁₁—⟨O⟩—COO—⟨O⟩—CN (wt %) | DE-1 (wt %) | ⅓·⅓ Margin | Central voltage | ΔT | γ | Δφ | $t_r$ (25° C. Central 10 μm voltage) |
|---|---|---|---|---|---|---|---|---|---|---|
| 4-1 | 40 | 40 | 20 | 0 | 6.61 | 3.00 | 8.9 | 1.16 | 0.830 | 120 |
| 4-2 | 37.5 | 37.5 | 20 | 5 | 7.07 | 3.03 | 7.6 | 1.17 | 0.832 | 130 |
| 4-3 | 35 | 35 | 20 | 10 | 7.45 | 3.04 | 7.1 | 1.17 | 0.840 | 140 |
| 4-4 | 32.5 | 32.5 | 20 | 15 | 8.0 | 3.08 | 7.0 | 1.16 | 0.840 | 140 |

TABLE 7-4

| Example 5 | FK-2 (wt %) | X-1 (wt %) | C₅H₁₁—⟨O⟩—COO—⟨O⟩—CN (wt %) | DE-2 (wt %) | ⅓·⅓ Margin | Central voltage | ΔT | γ | Δφ | $t_r$ (25° C. Central 10 μm voltage) |
|---|---|---|---|---|---|---|---|---|---|---|
| 5-1 | 40 | 40 | 20 | 0 | 6.61 | 3.00 | 8.9 | 1.16 | 0.830 | 120 |
| 5-2 | 37.5 | 37.5 | 20 | 5 | 6.91 | 3.05 | 8.0 | 1.16 | 0.835 | 130 |
| 5-3 | 35 | 35 | 20 | 10 | 7.10 | 3.08 | 7.6 | 1.17 | 0.835 | 140 |
| 5-4 | 32.5 | 32.5 | 20 | 15 | 7.50 | 3.12 | 7.2 | 1.16 | 0.832 | 140 |

Note
X - 1: See Table 6-7
DE-1: See Table 4-1
DE-2: See Table 4-2
FK-2: See Table 5-1
FK-3: See Table 5-2

The mixed systems in these tables show substantially the same time-division characteristic as the system of Example 2, indicating usefulness of the compounds of this invention in combination with any type of liquid crystals. As for responsiveness, it is known that there exists a proportional relation with viscosity as expressed by the formula: $t \propto \eta$. Also, in Example 2, the material added with 15% by weight of the compound

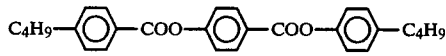

is increased in viscosity by about 50% as compared with the system not added with such compound. This implies about 1.5 time increase of responsiveness. However, the fact is to be noted that as in the examples shown in Table 7, the system added with about 15% of said compound is increased in responsiveness by only about 15% as compared with the systems not added with said compound, and in this case, the relation of $t \propto \eta$ does not hold good. That is because elastic constant is implicated to give a favorable result.

As described above, the nematic liquid crystal compositions for display devices according to this invention have a high margin and quick responsiveness, so that they can serve as best material for time-division driving system. They are also stable chemically and high reliability in use as liquid crystal material. Thus, the liquid crystal display devices using such compositions have many advantages over the conventional devices.

What is claimed is:

1. A nematic liquid crystal composition for use in display devices comprising
   (a) at least one compound of the formula:

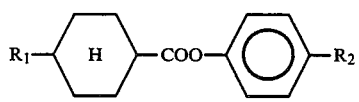
(I)

wherein $R_1$ is n—$C_mH_{2m+1}$, n—$C_mH_{2m+1}$—O, or n—$C_mH_{2m+1}$—CO; $R_2$ is n—$C_qH_{2q+1}$, n—$C_qH_{2q+1}$—O or n—$C_qH_{2q+1}$—CO; m and q are independently an integer of 1 to 10; and n is a symbol indicating that carbon atoms are linked linearly, and
   (b) at least one compound of the formula:

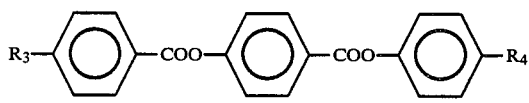
(II)

wherein $R_3$ is n—$C_rH_{2r+1}$ or n—$C_rH_{2r+1}$—O; $R_4$ is n—$C_sH_{2s+1}$ or n—$C_sH_{2s+1}$—O; r and s are independently an integer of 1 to 10; and n is as defined above; and
   (c) at least one nematic liquid crystal compound having positive dielectric anisotropy and/or its homologous compound in an amount of 4% by weight or more.

2. A nematic liquid crystal composition according to claim 1, which further comprises
   (d) at least one nematic liquid crystal compound having negative dielectric anisotropy and/or its homologous compound.

3. A nematic liquid crystal composition according to claim 1 or 2, wherein the component (c) is at least one compound selected from the group consisting of

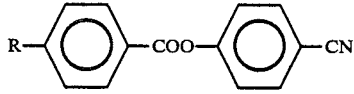

wherein R is n—$C_mH_{2m+1}$ or n—$C_mH_{2m+1}$—O; m is an integer of 1 to 10; and n is a symbol indicating that carbon atoms are linked linearly,

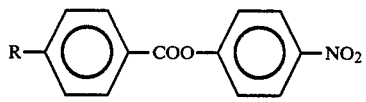

wherein R is as defined above,

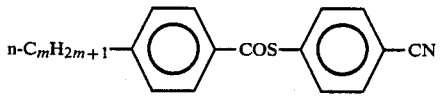

wherein m and n are as defined above,

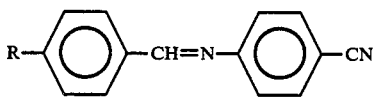

wherein R is n—$C_mH_{2m+1}$, n—$C_mH_{2m+1}$—O or n—$C_mH_{2m+1}$—COO; and m and n are as defined above,

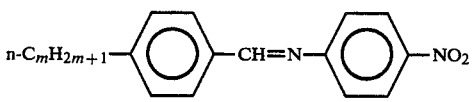

wherein m and n are as defined above,

wherein R is n—$C_mH_{2m+1}$, n—$C_mH_{2m+1}$—O or n—$C_mH_{2m+1}$—COO; and m and n are as define above,

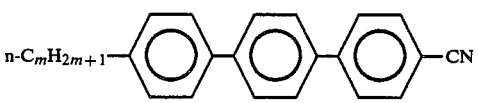

wherein m and n are as defined above,

wherein R is n—$C_mH_{2m+1}$ or n—$C_mH_{2m+1}$—O; and m and n are as defined above,

wheren u is an integer of 1 to 8; and n is as defined above,

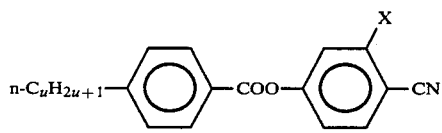

wherein X is halogen; an u and n are as defined above,

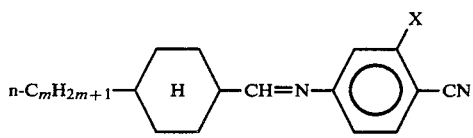

wherein X, m and n are as defined above,

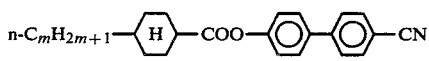

wherein m and n are as defined above, and

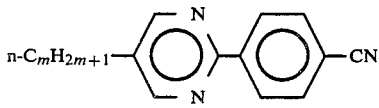

wherein m and n are as defined above.

4. A nematic liquid crystal composition according to claim 1 or 2, wherein the component (c) is at least one compound of the formula:

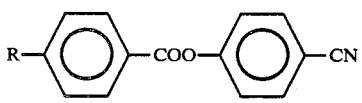

wherein R is n—$C_mH_{2m+1}$ or n—$C_mH_{2m+1}$—O, and m is an integer of 1 to 10.

5. A nematic liquid crystal composition according to claim 1 or 2, wherein the component (c) is at least one compound of the formula:

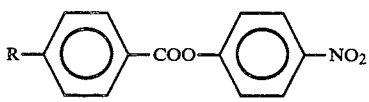

wherein R is n—$C_mH_{2m+1}$ or n—$CH_mH_{2m+1}$—O, and m is an integer of 1 to 10.

6. A nematic liquid crystal composition according to claim 1 or 2, wherein the component (c) is at least one compound of the formula:

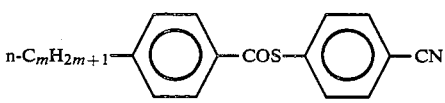

wherein m is an integer of 1 to 10.

7. A nematic liquid crystal composition according to claim 1 or 2, wherein the component (c) is at least one compound of the formula:

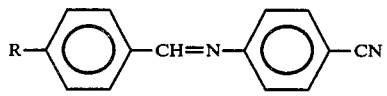

wherein R is n—$C_mH_{2m+1}$, n—$C_mH_{2m+1}$—O, or n—$C_mH_{2m+1}$—COO, wherein m is an integer of 1 to 10.

8. A nematic liquid crystal composition according to claim 1 or 2, wherein the component (c) is at least one compound of the formula:

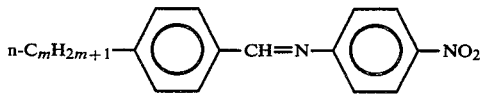

wherein m is an integer of 1 to 10.

9. A nematic liquid crystal composition according to claim 1 or 2, wherein the component (c) is at least one compound of the formula:

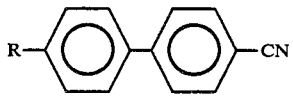

wherein R is n—$C_mH_{2m+1}$, n—$C_mH_{2m+1}$—O or n—$C_mH_{2m+1}$—COO, wherein m is an integer of 1 to 10.

10. A nematic liquid crystal composition according to claim 1 or 2, wherein the component (c) is at least one compound of the formula:

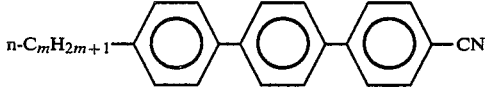

wherein m is an integer of 1 to 10.

11. A nematic liquid crystal composition according to claim 1 or 2, wherein the component (c) is at least one compound of the formula:

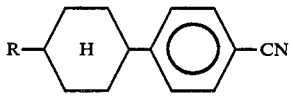

wherein R is n—$C_mH_{2m+1}$ or n—$C_mH_{2m+1}$—O, and m is an integer of 1 to 10.

12. A nematic liquid crystal composition according to claim 1 or 2, wherein the component (c) is at least one compound of the formula:

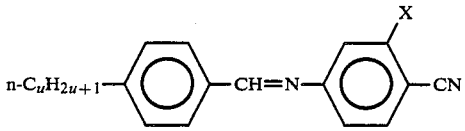

wherein u is an integer of 1 to 8, and X is a halogen.

13. A nematic liquid crystal composition according to claim 1 or 2, wherein the component (c) is at least one compound of the formula:

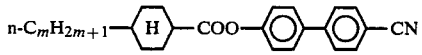

wherein m is an integer of 1 to 10.

14. A nematic liquid crystal composition according to claim 1 or 2, wherein the component (c) is at least one compound of the formula:

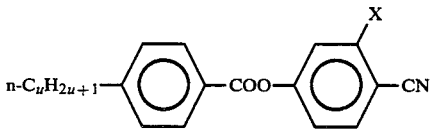

wherein u is an integer of 1 to 8, and X is a halogen.

15. A nematic liquid crystal composition according to claim 1 or 2, wherein the component (c) is at least one compound of the formula:

wheren u is an integer of 1 to 8.

16. A nematic liquid crystal composition according to claim 1 or 2, wherein the component (c) is at least one compound of the formula:

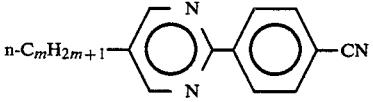

wherein m is an integer of 1 to 10.

17. A nematic liquid crystal composition according to claim 1, wherein the proportions of the components (a), (b) and (c) are
(a) 10 to 80% by weight,
(b) 2 to 30% by weight, and
(c) 4 to 70% by weight.

18. A nematic liquid crystal composition according to claim 2, wherein the proportions of the components (a), (b), (c) and (d) are
(a) 10 to 80% by weight,
(b) 2 to 30% by weight,
(c) 4 to 70% by weight, and
(d) 5 to 30% by weight.

19. A nematic liquid crystal composition according to claim 2, wherein the component (d) is at least one compound selected from the group consisting of

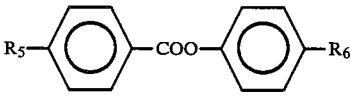

wherein $R_5$ is $n-C_mH_{2m+1}$, $n-C_mH_{2m+1}-O$, $n-C_mH_{2m+1}-COO$ or $n-C_mH_{2m+1}-O-COO$; $R_6$ is $n-C_qH_{2q+}$, $n-C_qH_{2q+1}-O$, $n-C_qH_{2q+1}-COO$ or $n-C_qH_{2q+1}-O-COO$; m and q are independently an integer of 1 to 10; and n is a symbol indicating that carbon atoms are linked linearly,

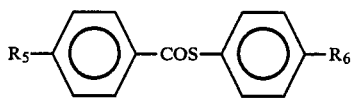

wherein $R_5$ is $n-C_mH_{2m+1}$ or $n-C_mH_{2m+1}-O$; $R_6$ is $n-C_qH_{2q+1}$ or $n-C_qH_{2q+1}-O$; and m, n and q are as defined above,

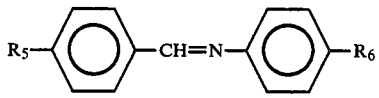

wherein $R_5$ is $n-C_mH_{2m+1}$, $n-C_mH_{2m+1}-O$, $n-C_mH_{2m+1}-O-CO$, $CH_3-O-(CH_2)_2-O$, $CH_3-O-CH_2-O$, $CH_3-O-(CH_2)_3-O$, $C_2H_5-O-(CH_2)_2-O$, $C_2H_5-O-(CH_2)_3-O$, or $C_3H_7-O-(CH_2)_2-O$; $R_6$ is $n-C_qH_{2q+1}$, $n-C_qH_{2q+1}-O$, $n-C_qH_{2q+1}-CO$, $n-C_qH_{2q+1}-COO$, $n-C_qH_{2q+1}-CO$, $$-\underset{\underset{CH_3}{|}}{CH}-C_4H_9 \text{ or } -(CH_2)_2-\underset{\underset{CH_3}{|}}{CH}-CH_3;$$

and m, n and q are as defined above,

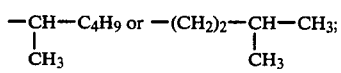

wherein $R_5$ is $n-C_mH_{2m+1}-O$ or $n-C_mH_{2m+1}-COO$; $R_6$ is $n-C_qH_{2q+1}$ or $n-C_qH_{2q+1}-O$; and m, n and q are as defined above,

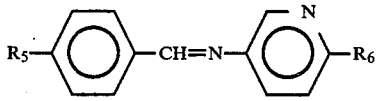

wherein $R_5$ is $n-C_mH_{2m+1}$, $n-C_mH_{2m+1}-O$ or $n-C_mH_{2m+1}-CO$; $R_6$ is $n-C_qH_{2q+1}$, $n-C_qH_{2q+1}-O$, $n-C_qH_{2q+1}-CO$ or $n-C_qH_{2q+1}-COO$; and m, n and q are as defined above,

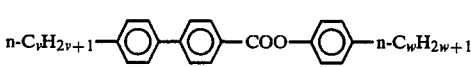

wherein v and w are independently an integer of 3 to 8; and n is as defined above, and

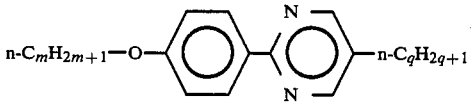

wherein m, n and q are as defined above.

20. A nematic liquid crystal composition according to claim 2, wherein the component (d) is at least one compound of the formula:

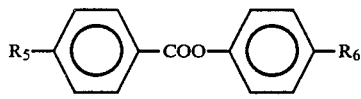

wherein $R_5$ is $n\text{—}C_mH_{2m+1}$, $n\text{—}C_mH_{2m+1}\text{—}O$, $n\text{—}C_mH_{2m+1}\text{—}COO$ or $n\text{—}C_mH_{2m+1}\text{—}O\text{—}COO$; $R_6$ is $n\text{—}C_qH_{2q+1}$, $n\text{—}C_qH_{2q+1}\text{—}O$, $n\text{—}C_qH_{2q+1}\text{—}COO$ or $n\text{—}C_qH_{2q+1}\text{—}O\text{—}COO$; and m and q are independently an integer of 1 to 10.

21. A nematic liquid crystal composition according to claim 2, wherein the component (d) is at least one compound of the formula:

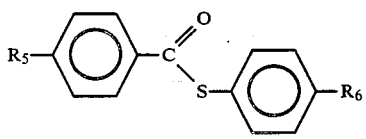

wherein $R_5$ is $n\text{—}C_mH_{2m+1}$ or $n\text{—}C_mH_{2m+1}\text{—}O$; $R_6$ is $n\text{—}C_qH_{2q+1}$ or $n\text{—}C_qH_{2q+1}\text{—}O$; and m and q are independently an integer of 1 to 10.

22. A nematic liquid crystal composition according to claim 2, wherein the component (d) is at least one compound of the formula:

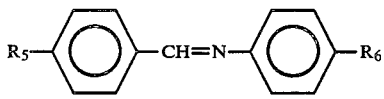

wherein $R_5$ is $n\text{—}C_mH_{2m+1}$, $n\text{—}C_mH_{2m+1}\text{—}O$, or $n\text{—}C_{m2m+1}\text{—}O\text{—}CO$; $R_6$ is $n\text{—}C_qH_{2q+1}$, $n\text{—}C_2H_{2q+1}\text{—}O$, $n\text{—}C_qH_{2q+1}\text{—}CO$, $n\text{—}C_qH_{2q+1}\text{—}O\text{—}CO$, or $n\text{—}C_qH_{2q+1}\text{—}COO$; and m and q are independently an integer of 1 to 10.

23. A nematic liquid crystal composition according to claim 2, wherein the component (d) is at least one compound of the formula:

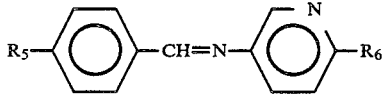

wherein $R_5$ is $n\text{—}C_mH_{2m+1}\text{—}O$ or $n\text{—}C_mH_{2m+1}\text{—}COO$; $R_6$ is $n\text{—}C_qH_{2q+1}$ or $n\text{—}C_qH_{2q+1}\text{—}O$; and m and q are independently an integer of 1 to 10.

24. A nematic liquid crystal composition according to claim 2, wherein the component (d) is at least one compound of the formula:

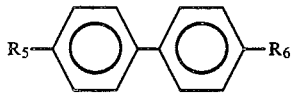

wherein $R_5$ is $n\text{—}C_mH_{2m+1}$, $n\text{—}C_mH_{2m+1}\text{—}O$ or $n\text{—}C_mH_{2m+1}\text{—}CO$; $R_6$ is $n\text{—}C_qH_{2q+1}$, $n\text{—}C_qH_{2q+1}\text{—}O$, $n\text{—}C_qH_{2q+1}\text{—}CO$ or $n\text{—}C_qH_{2q+1}\text{—}COO$; and m and q are independently an integer of 1 to 10.

25. A nematic liquid crystal composition according to claim 2, wherein the component (d) is at least one compound of the formula:

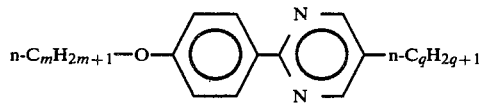

wherein m and q are independently an integer of 1 to 10.

26. A nematic liquid crystal composition according to claim 2, wherein the component (d) is at least one compound of the formula:

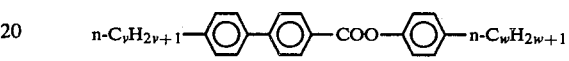

wherein v and w are independently an integer of 3 to 8.

27. A nematic liquid crystal composition according to claim 1 or 3, wherein the component (a) is a mixture of

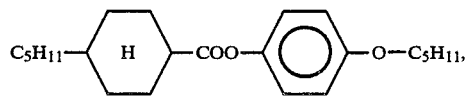

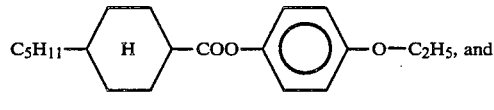

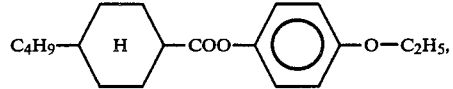

or a mixture of

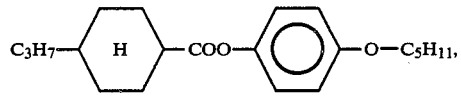

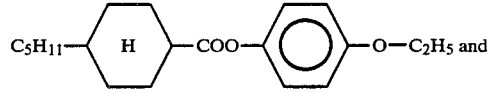

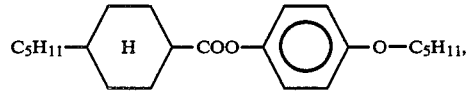

or a mixture of

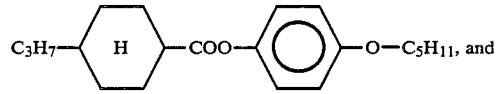

-continued

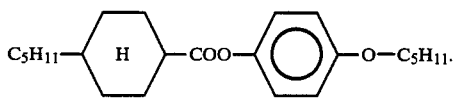

28. A nematic liquid crystal composition according to claim 1 or 2, wherein the component (b) is

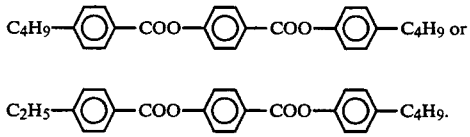

29. A nematic liquid crystal composition according to claim 1, wherein said composition consists essentially of components (a), (b) and (c), component (b) being an amount of from 2 to 30% by weight.

30. A nematic liquid crystal composition according to claim 1, wheren said composition consists essentially of 10 to 80% by weight of component (a), 2 to 30% by weight of component (b) and 4 to 70% by weight of component (c).

31. A nematic liquid crystal composition according to claim 2, wherein said composition consists essentially of 10 to 80% by weight of component (a), 2 to 30% by weight of component (b), 4 to 70% by weight of component (c) and 5 to 30% by weight of component (d).

32. A nematic liquid crystal composition according to claim 31 or claim 31, wherein the component (c) is at least one compound selected from the group consisting of

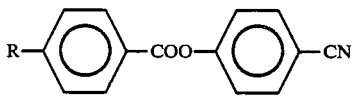

wherein R is n—$C_mH_{2m+1}$ or n—$C_mH_{2m+1}$—O; m is an integer of 1 to 10; and n is a symbol indicating that carbon atoms are linked linearly,

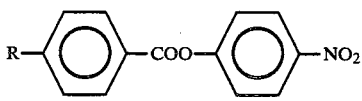

wherein R is as defined above,

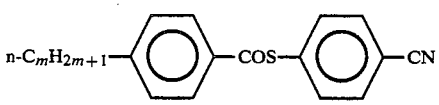

wherein m and n are as defined above,

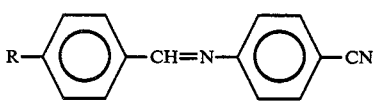

wherein R is n—$C_mH_{2m+1}$, n—$C_mH_{2m+1}$—O or n—$C_mH_{2m+1}$—COO; and m and n are as defined above,

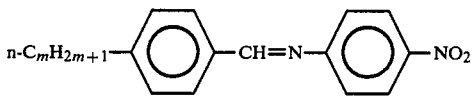

wherein m and n are as defined above,

wherein R is n—$C_mH_{2m+1}$, n—$C_mH_{2m+1}$—O or n—$C_mH_{2m+1}$—COO; and m and n are as defined above,

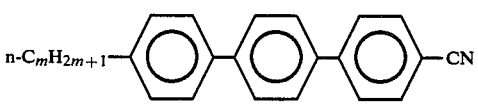

wherein m and n are as defined above,

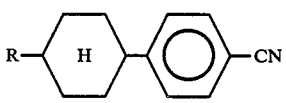

wherein R is n—$C_mH_{2m+1}$ or n—$C_mH_{2m+1}$—O; and m and n are as defined above,

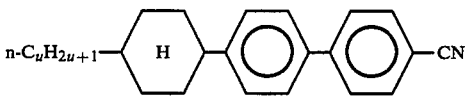

wherein u is an integer of 1 to 8; and n is as defined above,

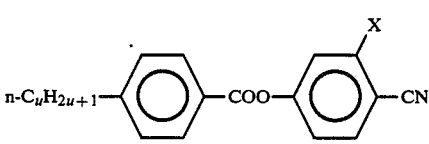

wherein X is halogen; and u and n are as defined above,

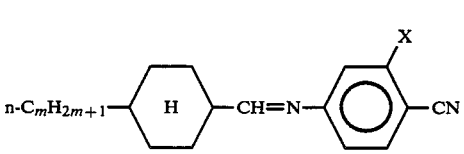

wherein X, m and n are as defined above,

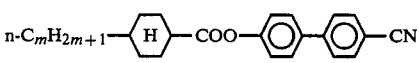

wherein m and n are as defined above, and

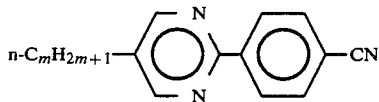

wherein m and n are as defined above.

33. A nematic liquid crystal composition according to claim 30, wherein said component (c) is

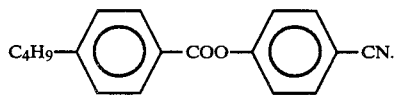

34. A nematic liquid crystal composition according to claim 31, wherein component (c) is

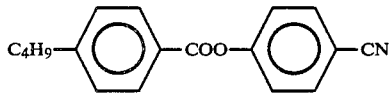

and component (d) is

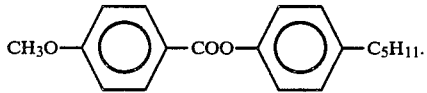

35. A nematic liquid crystal composition according to claim 30, wherein said component (c) is at least one compound selected from the group consisting of

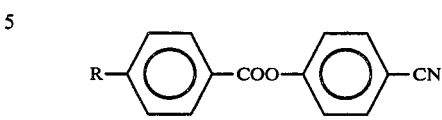

wherein R is n—$C_mH_{2m+1}$ or n—$C_mH_{2m+1}$—O, and m is an integer of 1 to 10.

36. A nematic liquid crystal composition according to claim 31, wherein component (c) is at least one compound selected from the group consisting of

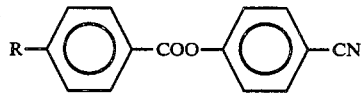

wherein R is n—$C_mH_{2m+1}$ or n—$C_mH_{2m+1}$—O, and m is an integer of 1 to 10 and component (d) is at least one compound selected from the group consisting of

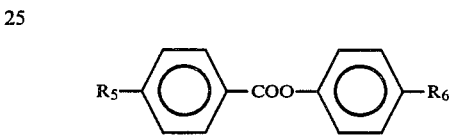

wherein $R_5$ is n—$C_mH_{2m+1}$, n—$C_mH_{2m+1}$—O, n—$C_mH_{2m+1}$—COO or n—$C_mH_{2m+1}$—O—COO; $R_6$ is n—$C_qH_{2q+1}$, n—$C_qH_{2q+1}$—O, n—$C_qH_{2q+1}$—COO or n—$C_qH_{2q+1}$—O—COO; and m and q are independently an integer of 1 to 10.

* * * * *